US008018954B2

(12) United States Patent
Jamieson et al.

(10) Patent No.: US 8,018,954 B2
(45) Date of Patent: Sep. 13, 2011

(54) INVERTED PASSIVE OPTICAL NETWORK/INVERTED PASSIVE ELECTRICAL NETWORK (IPON/IPEN) BASED DATA FUSION AND SYNCHRONIZATION SYSTEM

(75) Inventors: John Jamieson, Raleigh, NC (US); Joseph Murray, Fairfax Station, VA (US); Gregg Johnson, Fairfax, VA (US); Sylvan I. Caplan, Owings Mills, MD (US)

(73) Assignee: 3 Phoenix, Inc., Chantilly, VA (US)

( * ) Notice: Subject to any disclaimer, the term of this patent is extended or adjusted under 35 U.S.C. 154(b) by 997 days.

(21) Appl. No.: 11/847,963

(22) Filed: Aug. 30, 2007

(65) Prior Publication Data

US 2007/0291777 A1 Dec. 20, 2007

Related U.S. Application Data

(63) Continuation of application No. PCT/US2006/007203, filed on Mar. 2, 2006.

(60) Provisional application No. 60/657,424, filed on Mar. 2, 2005.

(51) Int. Cl.
*H04L 12/28* (2006.01)
(52) U.S. Cl. ...................................... 370/401
(58) Field of Classification Search ............... 370/401, 370/390, 389, 351, 420, 432, 445, 402, 400, 370/403, 463, 392, 394; 398/66, 67, 72, 398/70
See application file for complete search history.

(56) References Cited

U.S. PATENT DOCUMENTS

| | | | | |
|---|---|---|---|---|
| 5,398,129 A * | 3/1995 | Reimann | ...................... | 398/100 |
| 5,710,648 A | 1/1998 | Frigo | | |
| 6,844,809 B2 | 1/2005 | Manis et al. | | |
| 7,020,701 B1 * | 3/2006 | Gelvin et al. | ................ | 709/224 |
| 7,212,517 B2 * | 5/2007 | Dzik | ............................ | 370/352 |
| 7,373,084 B2 * | 5/2008 | Yun et al. | ....................... | 398/72 |
| 7,701,954 B2 * | 4/2010 | Rabenko et al. | ............. | 370/401 |

OTHER PUBLICATIONS

International Search Report, PCT/US06/07203, Mar. 2, 2006.
ITU-T G.983.1; Broadband Optical Access Systems Based on Passive Optical Networks (PON) TU-T Rec. G.983.1—Prepublished version, 124 pgs. (Jan. 2005).
ITU-T-G.984.3, Gigabit-capable Passive Optical Networks (G-PON): Transmission Convergence Layer Specification G.984.3; Geneva, CH, (Feb. 2004)—Prepublished version 112 pgs.

(Continued)

*Primary Examiner* — Chi H Pham
*Assistant Examiner* — Alexander Boakye
(74) *Attorney, Agent, or Firm* — Manatt, Phelps & Phillips LLP

(57) ABSTRACT

The present invention is an apparatus, method and system for time synchronizing data from various sensor types that enables data fusion and transport. To provide this capability, the present invention utilizes an inverted Passive Optical Network (PON) approach for synchronous communication. Further, the present invention introduces an inverted Passive Electrical Network (iPEN) that extends the iPON approach. Data that are in a common format with embedded time synchronization information can easily be integrated or fused and transported over such communication links. The present invention provides the ability to merge and aggregate data from a wide range of disparate sensors and systems while maintaining close synchronization. The present invention is appropriate for synchronization of data, voice, and video onto a single network and/or multi-tiered networks and can also handle signal processing and control technologies at line rates well into the Gigabits per second (Gbps) range.

16 Claims, 21 Drawing Sheets

OTHER PUBLICATIONS

Data-Over-Cable Service Interface Specifications; DOCSIS 2.0; Operations Support System Interface Specification; CM-SP-OS-SIv2.0-I08-050408; Cable Television Laboratories, Inc.; © Copyright 1999-2005; 440 pgs.

ITU-T-G.984.1; Gigabit-Capable Passive Optical Networks (GPON): General characteristics; Geneva CH (Mar. 2003), 22 pgs.
ITU-T-G.984.2; Gigabit-Capable Passive Optical Networks (GPON):Physical Media Dependent (PMD) Layer Specification; Geneva CH (Mar. 2003), 32 pgs.

* cited by examiner

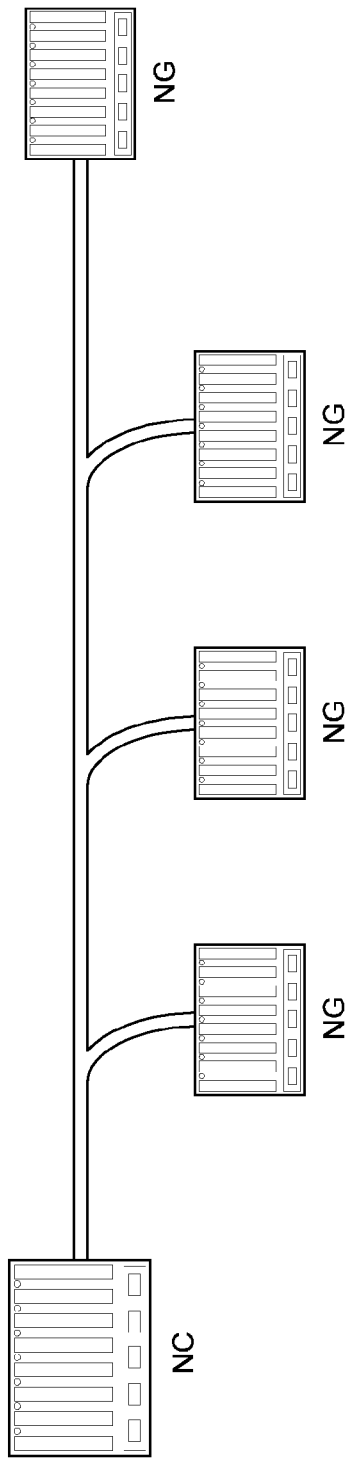

Inverted Passive Electrical Network (iPEN)

- 3PI Inverted Passive Electrical Approach (PEN) supports single and dual coax operation.
- Broadband cable industry standard based single and dual coax.
- Supports up to 40Mbps over 5Km.
- Based on a 24-bit configurable Acoustic Sensor Node.
  - 24/16/12-bit data modes
  - Variable sample rate
- Enables use of COTS receiver.
- Packaging challenge for the couplers
  - Two coax approach suitable for towed array applications.

FIG. 2D

Failsafe Line Receiver Block Diagram and Input to Output Performance

Failsafe Line Driver Block Diagram and Input to Output Performance

Engineering Sensor Node (ESN) Detailed Block Diagram

INVERTED PASSIVE OPTICAL NETWORK/INVERTED PASSIVE ELECTRICAL NETWORK (IPON/IPEN) BASED DATA FUSION AND SYNCHRONIZATION SYSTEM

CROSS REFERENCE OF APPLICATION

This application is a continuation of International Patent Application No. PCT/US2006/007203, filed on Mar. 2, 2006, which claims priority to U.S. Patent Application No. 60/657,424, filed Mar. 2, 2005.

GOVERNMENT RIGHTS STATEMENT

This invention was made with Government support under Contract N00244-04-P-1737 awarded by the Department of the Navy. The Government has certain rights in the invention.

BACKGROUND OF THE INVENTION

This present invention relates to a system for sharing data between a plurality of data sources. Specifically, the subject matter of the present invention is directed toward a synchronous apparatus, method and system for data fusion amongst a large number of sensors or other data sources.

BACKGROUND OF THE INVENTION

FIG. 1 illustrates an exemplary Gigabit PON (GPON) system architecture of the background art. The GPON backbone enables the network to fully leverage the bandwidth by concatenating many common protocols within a single stream. Furthermore, access to the voice and data streams is transparent to Local Area Network (LAN) technologies such as Fast Ethernet (FE), Gigabit Ethernet (GE), SONET OC-3-OC-12, as well as their copper counterparts.

There are two major components of the network of FIG. 1: the Optical Line Termination (OLT) and the Optical Network Termination (ONT). Note, the OLT and ONT are also referred to as Network Controller and Network Gateway, respectively. In the system architecture shown in FIG. 1, the OLT acts as a bridge between the GPON network and the upstream user networks (e.g., LAN, Wide Area Network (WAN)). The OLT has the capability to communicate simultaneously with LAN protocols as well as WAN protocols.

Many sensors and systems exist that produce data products at multiple different data rates using different protocols. These include analog and digital sensors and systems for data fusion. Exploitation of data from multiple sensors or systems is significantly enhanced when the data is sampled synchronously and/or when timing is controlled deterministically. The background art has not addressed such data fusion systems with both a passive and synchronous approach. Therefore, there is a need in the art for an apparatus, method and system with widely disparate sensors and systems that produces data at multiple different data rates that can be synchronously sampled, fused, and aggregated into a single telecommunications passive optical or electrical network.

SUMMARY OF THE INVENTION

The present invention is an apparatus, method and system for time synchronizing data from various sensor types that enables data fusion and transport. To provide this capability, the present invention utilizes an inverted Passive Optical Network (PON) approach for synchronous communication. Further, the present invention introduces an inverted Passive Electrical Network (iPEN) that extends the iPON approach. Data that are in a common format with embedded time synchronization information can easily be integrated or fused and transported over such communication links. The present invention provides the ability to merge and aggregate data from a wide range of disparate sensors and systems while maintaining close synchronization. The present invention is appropriate for synchronization of data, voice, and video onto a single network and can also handle signal processing and control technologies at line rates well into the Gigabits per second (Gbps) range.

The present invention is an innovative, highly reliable, simple, small, and cost effective telemetry solution for sonar applications. The present invention leverages ongoing development of the inverse Passive Optical Network (iPON) and inverse Passive Electrical Network (iPEN) telemetry systems. In particular, the present invention is highly reliable because it leverages a simple passive networking architecture that is derived from the Telecom Passive Optical Network (PON) and cable industry Data-Over-Cable Service Interface Specification (DOCSIS) standards and utilizes a minimum amount of active electronics. The present invention is simple since it utilizes a single fiber or single and two coax data and power scheme that is consistent with the existing system designs. The present invention is cost effective because it relies on widely available commercial components.

The present invention exploits features of the network technology carried within both iPON and iPEN. In particular, PON technologies of the background art that are being widely adopted by the Telecommunications and Digital Cable service providers. Broadband cable and Telecom Service Providers are using PON and DOCSIS based cable systems to stream hundreds of channels of video, voice and data to end users with a fraction of the data returning as user voice and data. In contrast to these implementations, the data flows within the architecture iPON/iPEN are the inverse of typical telecom applications. That is, in the present invention, the downstream data is reduced to timing and control information. The bulk of the data is user/sensor data flowing upstream from the user/sensor to a processing and analysis system.

One of a plurality of embodiments of the present invention is a communication system located between a first location, including a data store, and a plurality of data sensors remote from the first location, at least some of the data sensors remote from other data sensors. The system of the present invention further comprises the following elements:

- A network controller at the first location generating and embedding plural timing and control signals, the timing and control signals arranged so that data which is synchronous with the timing signals will allow for data fusion notwithstanding wide geographic dispersion among said data sensors;
- a passive communication medium connecting said network controller and the remote data sensors and transmitting the timing and control signals from the network controller to the remote data sensors;
- a plurality of network gateways, each said network gateway coupled between said passive communications medium and one or more adjacent data sensors, each network gateway adapting the embedded timing and control signals for extracting and generating timing signals to adjacent data sensors;
- a plurality of the data sensors responding to the timing signals for generating data signals, each of the network gateways responding to data signals from adjacent sensors for generating data signals synchronous with the timing signals for transmission along the passive communications medium towards the network controller.

In addition, in this embodiment an aggregate data rate from the remote data sensors towards the network controller is orders of magnitude larger than a data rate from the network controller towards the remote data sensors.

Preferably, in this embodiment at least one network gateway derives power only from the passive communications medium. Preferably, all network gateways derive power only from the passive communications medium. Preferably, at least one data sensor derives power only from the passive communications medium via a network gateway. Preferably, all data sensors derive power only from the passive communications medium via a network gateway. Preferably, the passive communications medium is an optical fiber. Preferably, the communications medium is electrical cable. Preferably, the passive communications medium is both optical fiber and electrical cable.

The present invention provides an approach that maintains the simplicity and industry leading availability of the legacy systems. The approach taken by the present invention is directed toward the elimination of single point failures through a simple, passive, add-drop tap implementation that minimizes the number of wires and components required to construct the data acquisition and communication network. The iPON and iPEN technologies will be described in more detail in the following paragraphs.

BRIEF DESCRIPTION OF THE DRAWINGS

FIG. 2D illustrates an exemplary iPON architecture of the present invention.

DETAILED DESCRIPTION

The Passive Optical Network (PON) is a protocol standard (e.g., ITU-T G.983, G.984 and IEEE 802.3ah and EFM) that supports nominal line rates of 1244.160 Mbit/s and 2488.320 Mbit/s in the downstream direction and 155.520 Mbit/s, 622.080 Mbit/s, 1244.160 Mbit/s and 2488.320 Mbit/s in the upstream direction. Both symmetrical and asymmetrical PON systems have been defined and deployed. PON utilizes passive optical technology which greatly reduces the cost and power requirements while significantly enhancing system reliability.

The uses of passive optical splitters and wave division multiplexing (WDM) technologies for an individual sensor or groups of sensors is the enabling technology for highly deterministic coherent sampling between distributed sensors. With these technologies, time synchronization and sensor sampling accuracy of less than 10 nanoseconds can be achieved. PON provides a Time Domain Multiple Access (TDMA) network and can support many network protocols from data to voice. One of the unique features of PON is that it directly incorporates the WDM capability that supports bidirectional line rates on a single fiber. PON defines one or two dedicated downlink wavelengths (1490 and 1550 nm) and at least one dedicated uplink wavelength (1310 nm).

The PON standards have been developed by a large industry consortium and published by the International Telecommunications Union as ITU-T Group G984.1-4. PON incorporates timing and routing information necessary for transferring data between terminal devices. PON is designed to support consolidation of voice, video, and data into a single highly reliable network. The present invention is an apparatus, method and system that exploit the features of PON to build a reliable, low power, synchronous fusion engine for both analog and digital data sources.

The present invention includes a network Add-Drop Multiplexer-like Network Gateway (NG) that extracts and adapts timing data embedded by the Network Controller from an iPON network and generates deterministic local control signals. In particular, the present invention is a method for operating a Network Gateway, comprising: (1) accepting data from at least one of independent analog; digital and smart sensors; (2) synchronizing the data to a common time standard; (3) multiplexing multiple data products into super frames; (4) optionally encrypting or compressing the data;

and (4) re-transmitting the data over a variety of at least one of RF channels and IP-based networks.

Figure 1:
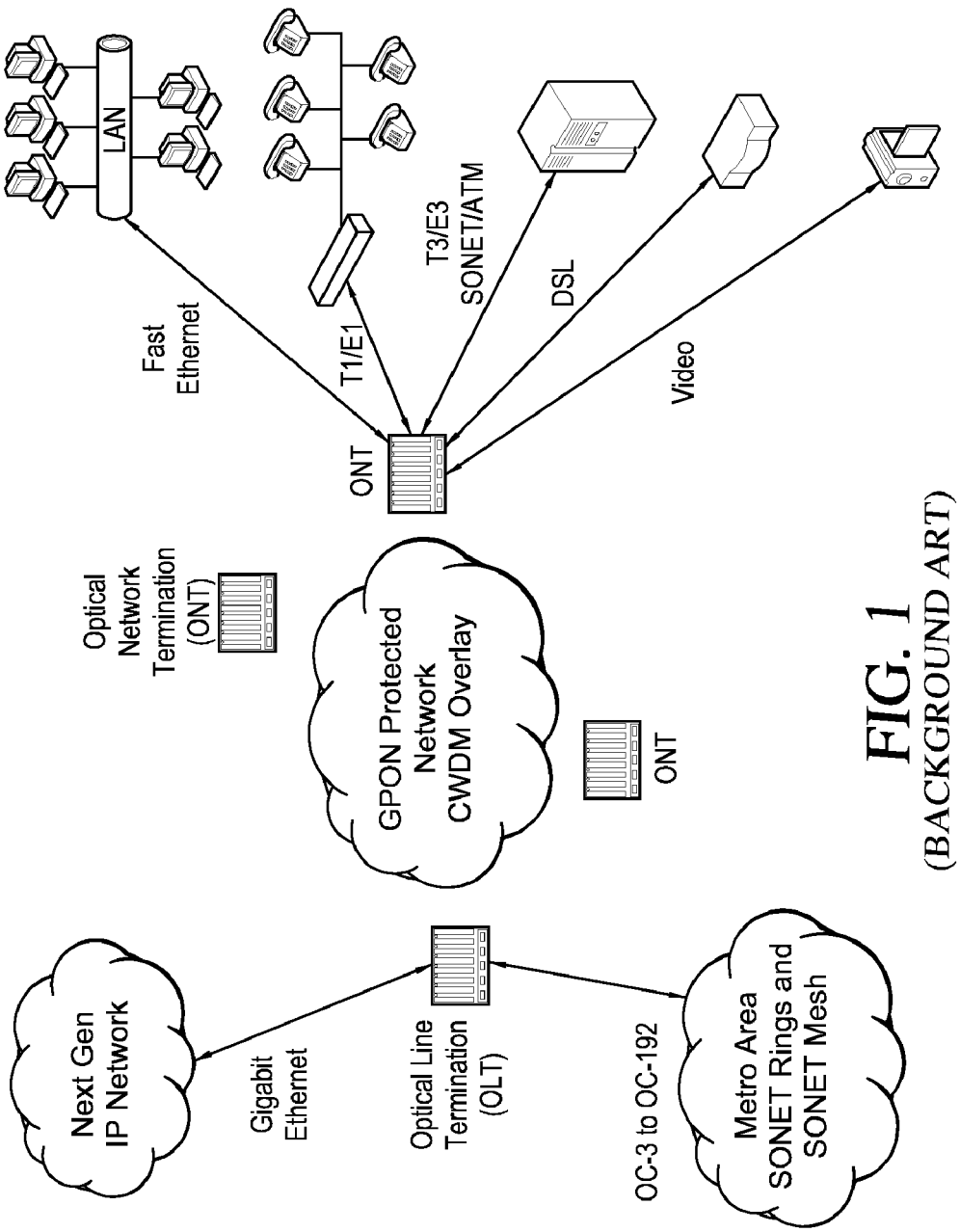
FIG. 1 illustrates an exemplary Gigabit PON (GPON) system architecture of the background art.

The most important aspect of the GPON of FIG. 1 is that it provides a synchronous physical media dependent (PMD) layer which enables distribution of proprietary deterministic timing data to the ONTs through a series of nested control frames. The OLT can be a commercial subsystem available from several leading Telecom OEMs. The design of the present invention utilizes embedded OLT message fields to provide time synchronization data to all ONT devices downstream. The Network Gateways (NGs) of the present invention are specialized iPON ONT implementations. The NG permits an iPON network to be used as a synchronous backbone infrastructure for sampling and fusion of disparate sensors and systems. Each NG has full Quality of Service (QoS) control and full-duplex deterministic communications. Each NG is a passive tap from as little as a single fiber connection. The NGs can communicate with any down stream sensor suite (e.g., analog or digital). Effectively, the NGs bridge disparate network technologies into a common backbone; that is accessible to a range of LANs and WANs. These include, but are not limited to: conventional current and voltage modulated analog sensors; local communications like IEEE 802.15.4 and 802.1 lb/g based wireless; digital sensors; and standard compliant digital sensors (e.g., IEEE 1451.3).

Figure 2A:
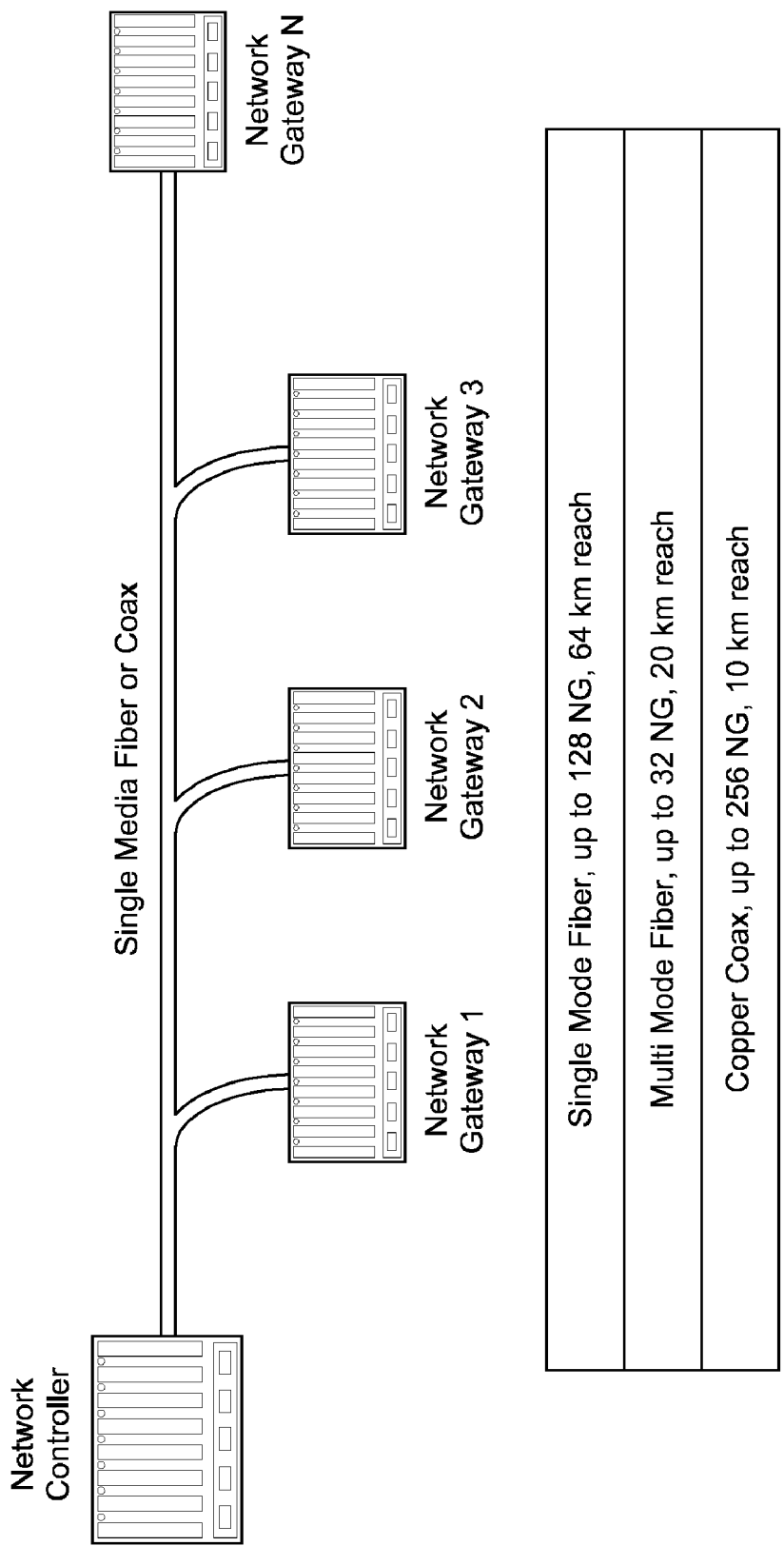
FIG. 2A presents a distributed sensor system using iPON/iPEN based network technologies.

The present invention provides a scalable solution for data synchronization and fusion. FIG. 2A presents the typical architecture for a Generic iPON-iPEN network system architecture. The Generic iPON-iPEN system architecture of the present invention provides an Internet Protocol (IP)-centric network solution capable of supporting both deterministic synchronization and message based time of day distribution protocols.

FIG. 2A presents a distributed sensor system using iPON/iPEN based network technologies. The iPON/iPEN PMD and TC Layers provide a recovered byte rate clock, 8 KHz frame pulse, and I KHz reference traceable to a Stratum 1 or Stratum 3 clock based on network or standalone operation. The embedded 30 bit frame ID and Physical Layer Operation Administration & Maintenance (PLOAM) message fields are exploited as a mechanism for deriving nested frame and super-frame construction, unique message sequence numbers, and Time-of-Day (ToD) functionality. Flexible payload configuration supports full network message capabilities. The present invention provides a modular, scalable architecture that enables mission or program specific configurations to be easily implemented.

FIG. 2A illustrates an exemplary Generic iPON/iPEN Network Gateway (NG) of the present invention. The generic iPON/iPEN architecture includes, but is not limited to, a single media fiber or coax cable that connects a plurality of Network Gateways. The iPON/iPEN architecture of FIG. 2A may support up to 128 NGs and has at least a 64 km reach using single mode fiber. The iPON/iPEN architecture of FIG. 2A may support up to 32 NGs and has at least a 20 km reach using multi-mode fiber. The iPON/iPEN architecture of FIG. 2A may support up to 256 NGs and has at least a 10 km reach using copper coax cable.

In the general description of Passive Optical Networks (PON) illustrated by FIG. 1, the line termination device is call an Optical Line Termination (OLT) device and the network taps are referred to as Optical Network Termination (ONT) devices. In contrast to the PON, the iPON implementation has major differences which include:

The iPON is a synchronous data fusion networks and is inverted, from a data rate perspective, as compared to the PON. That is, in PON networks high bandwidth data is transmitted from the OLT to the ONTs. In contrast, in the iPON the major data flow is inverted in that the Network Gateways (NGs), which are analogous to the ONTs, transmits high bandwidth data to the Network Controller (NC), which is analogous to the OLT.

The NG provides a superset of functionality to that which found on an ONT and the NC provides a superset of functionality that is found on an OLT.

An iPON is an inverted fiber optic network that exploits embedded timing and user definable fields in a standard PON implementation to control the synchronous fusion of data at the NGs. The NC is a special OLT that has high quality timing interfaces. The present invention provides the options for Network Time Protocol, GPS Time stamps, or IRIG B and G inputs which are inserted into the user data fields by our enhanced OLT or Network Controller and extracted by an enhanced ONT or Network Gateway that can be inserted as a synchronous source to the NGs.

The NGs are special ONTs that exploit these embedded control (e.g., the definable fields referenced above) and timing signals (i.e., high quality timing interfaces referenced above). The iPON and iPEN architectures are fundamentally passive tap architectures for fiber and wire networks, respectively. In both the iPON and iPEN cases a failure at any single or multiple NGs will not disrupt any communications in the primary network path. This capability provides a robust and reliable synchronization and fusion system that is resilient to lower level network failures. The iPEN is a completely unique implementation of the iPON architecture with a wire-based media (e.g., copper). The iPEN enables users who either don't have access or cannot afford to pull fiber into their facility or platform. The iPEN is a lower performance, lower cost, and lower power implementation of the PON architecture.

The passive architecture of the iPON and iPEN is unique in that no active electronics are in the primary network path. Essentially, passive enables higher reliability which is normally referred to as higher "availability" in industry. This implies the system is available for use over 99.999% of the time (five 9s reliability). Downtime equates to lost revenue and dissatisfied customers. Active electronics inline reduces this capability and limits the accuracy of the sensor to sensor phase error that can be maintained during the acquisition, time stamping, and fusion process.

The iPON and iPEN system architecture supports the creation of multi-tiered networks that support large quantities of synchronous fused data in an inverted network. The iPON network can be used as a Wide Area Network (WAN), the iPEN can be used as a lower tier network living under the iPON as a Metro Area Network (MAN), and the lowest level synchronous fusion network is a fail-safe. The Fail-Safe Sensor Network if the lowest level lowest cost local network technology which maintains the simple concept that no one device can pull down the rest of the network by being constrained to fail in a "safe" mode only Local Area Network (LAN).

Figure 2B:
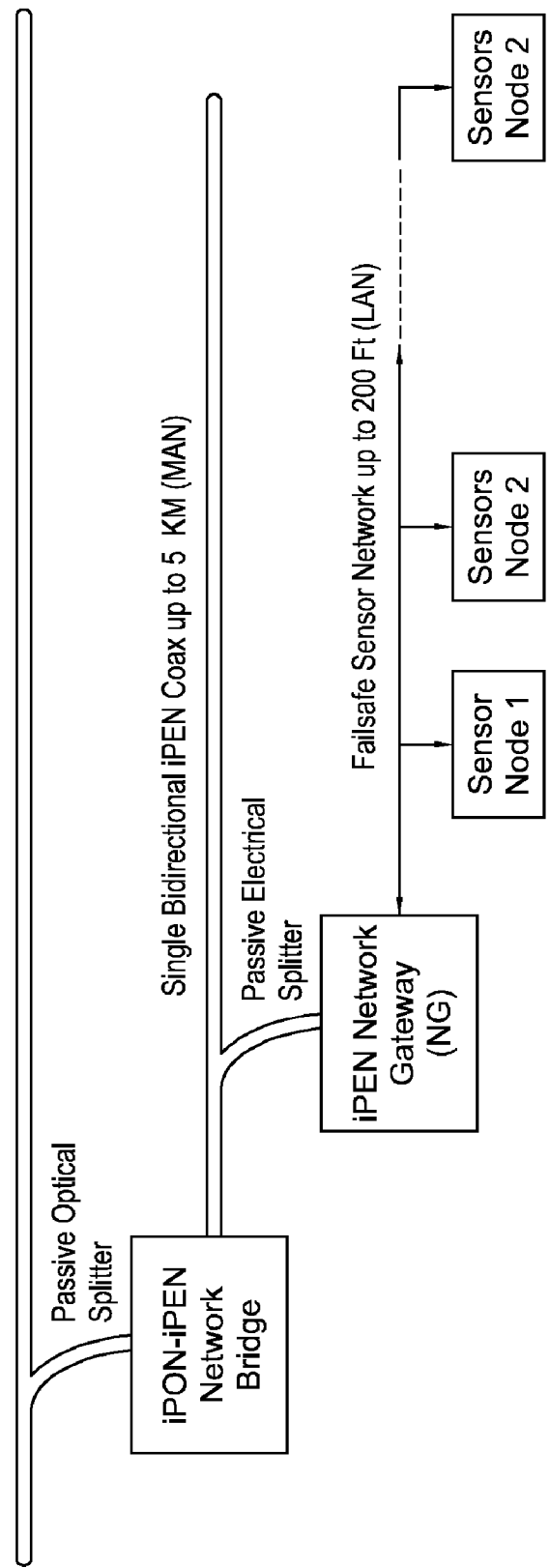
FIG. 2B illustrates an exemplary multi-tiered approach for implementing the iPON/iPEN technology of the present invention.

FIG. 2B illustrates an exemplary multi-tiered approach for implementing the iPON/iPEN technology of the present invention. Example implementations can be developed for both low-density localized sensor applications as well as distributed and widely distributed high-density system. Synchronous data fusion systems can be constructed as combinations: WAN-MAN-LAN, WAN-LAN, and MAN-LAN tiered systems. This permits the inverted network, with high bandwidth uplinks, to cascade to various levels of bandwidth and physical reach with a reliable passive architecture.

Figure 2C:
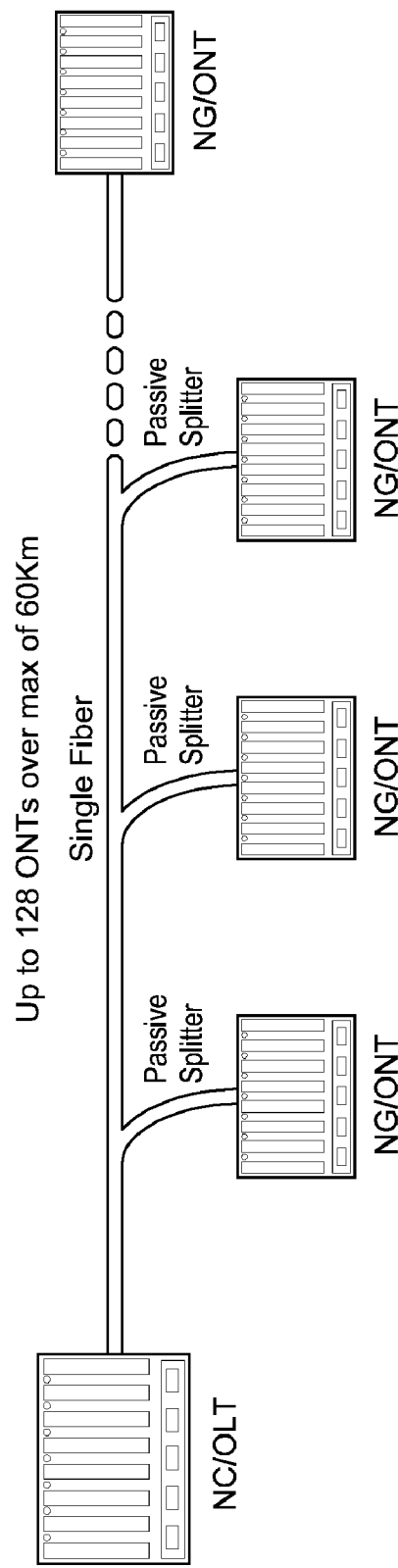
FIG. 2C illustrates an exemplary Gigabit iPON (GiPON) Optical Data Network (ODN) architecture of the present invention.

FIG. 2C illustrates an exemplary Gigabit iPON (GiPON) Optical Data Network (ODN) architecture of the present invention. In particular, FIG. 2C shows a single NC/OLT acting as network master (e.g., providing a time tag generator). The single NC/OLT provides for ring, star, tree, point-to-point, and point-to-multipoint architectures to be supported. In addition, the NC/OLT generates a continuous 8 KHz frame based downstream signal for iPON/iPEN Network Gateways (i.e., ONTs) on the network. Passive optical splitters provide the network add/drop function ensuring the only latency between network elements is the optical propagation delay. This feature enables the logic of the present invention to generate extremely accurate and deterministic sample intervals.

The Network Gateway of this embodiment of the present invention comprises: a iPON\iPEN network interface, sensor interfaces, sensor synchronization logic which provides network adaptation, data acquisition and data buffering logic. The single iPON fiber supports full duplex communication for up to 128 ONTs or NGs. Network Gateways multiplex data in burst-mode onto the common upstream wavelength in dynamically configured time slots or transmission containers (T-CONTs). The iPON ODN architecture of the present invention provides a protocol agnostic open architecture for non-homogenous sensor types.

FIG. 2D illustrates an exemplary iPEN architecture of the present invention. In particular, FIG. 2D shows a single Network Controller acting as network master (e.g., providing a time tag and embedded frame generator). The single Network Controller provides for ring, star, tree, point-to-point, and point-to-multipoint architectures to be supported. In addition, the iPON supports single and dual coax operation. Further, the dual coax approach is suitable for towed array configurations.

The embodiment of FIG. 2D utilizes broadband cable industry standard based single and dual coax cable configurations may be utilized that support data rates up to 40 Mbps and a reach of over 5 Km. The iPON architecture utilizes a 24 bit configurable Acoustic Sensor Node (ASN) with variable sample rates and 24/16/12-bit data modes. The Network Controller generates a continuous frame based downstream signal for iPON/iPEN Network Gateways (i.e., ONTs) on the network. Passive optical or electrical splitters provide the network add/drop function ensuring the only latency between network elements is the optical propagation delay. This feature enables the logic of the present invention to generate extremely accurate and deterministic sample intervals.

Figure 3:
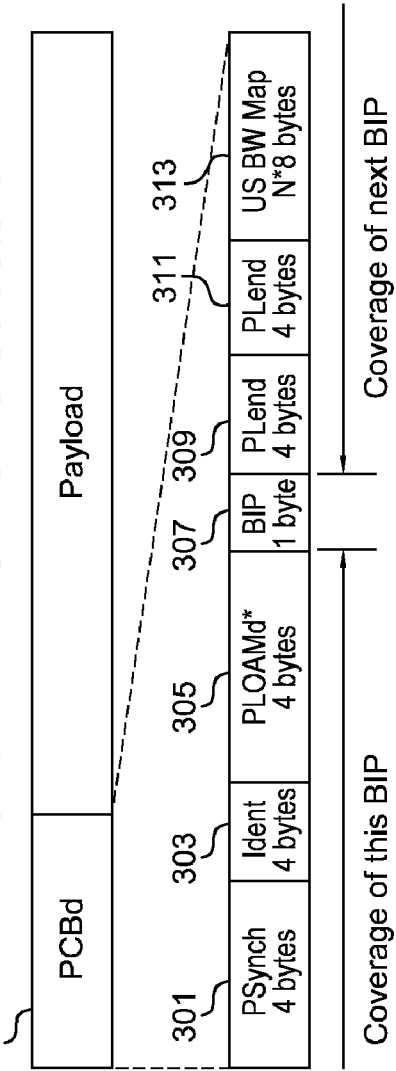
FIG. 3 presents an exemplary detailed downstream iPON/iPEN Transmission Convergence (TC) Layer frame structures.
Figure 4:
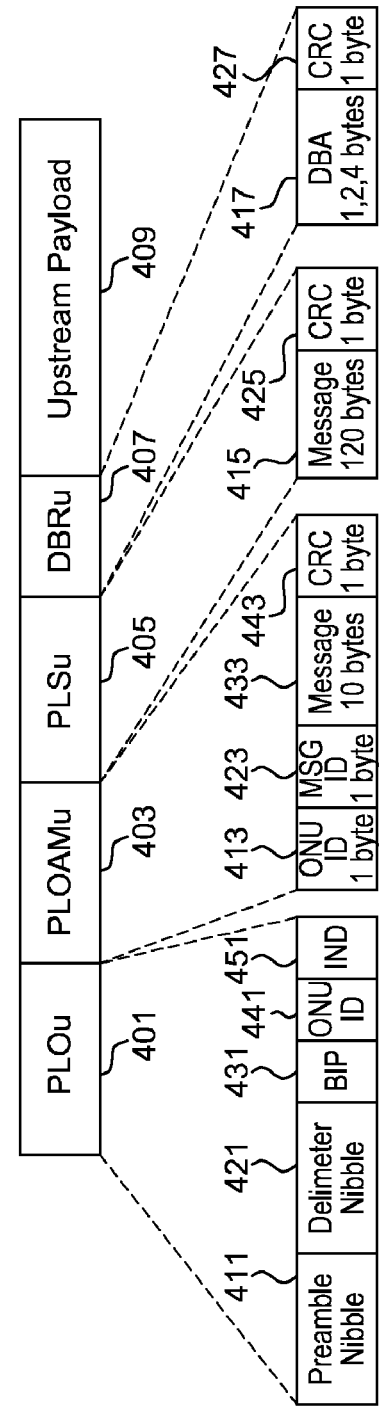
FIG. 4 presents an exemplary detailed upstream iPON/iPEN frame structures.

FIG. 3 and FIG. 4 present exemplary detailed downstream and upstream iPON/iPEN Transmission Convergence (TC) Layer frame structures, respectively. The downstream Physical Control Block (PCBd) defines T-CONT mapping in the Upstream Bandwidth Map fields. Data is synchronously sampled and/or acquired, then formatted into packets which provide data set fusion through the data integration and the incorporation of time data. Data time stamps, unique sequence numbers, and system status are inserted into packets containing data from the sensors. The time synchronization data is generated, synchronized by a master distributed source and distributed via the standard iPON/iPEN TC Layer Protocol. The frequency at which the packets are generated is application specific. The packet rate is related to the sample rate, desired message rate, and is referred to as the superframe.

As shown in FIG. 3, the iPON/iPEN TC Layer Protocol provides deterministic control fields in a Physical Control Block 300. The Physical Control Block "downstream" contains the following fields:
  a. 4 byte Physical Sync frame alignment word 301 that generates an 8 KHz frame sync reference pulse;
  b. 4 byte frame Identification field 303 for superframe indication that utilizes logic of the present invention to align lower frequency sample rates and identify superframes;
  c. 13 byte Physical Layer Operation Administration and Maintenance (PLOAM) message field 305 that utilizes logic of the present invention to insert and extract additional frame synchronization and time stamp fields;
  d. 1 byte Bit Interleaved Parity 307;
  e. 4 byte Payload Length 309;
  f. Redundant 4 byte Payload Length 311;
  g. Upstream BW Map 313 of N*8 bytes, where N is the number of ONTs, for attached ONTs T-CONT mapping; and
  h. Payload ATM and GEM partitions 315 allocated.

A Network Controller (NC) generates a recovered byte rate clock (i.e., ⅛ the line rate), an 8 KHz frame reference, and a 1 KHz reference signal. The TC Layer also provides a 30 bit frame ID field. The ID field is extracted and masked by the external logic of the present invention to enable a mechanism for sub-frame or super-frame construction which can be used as the sensor message rate or at a lower frequency sample rate. Multiplying Phase Locked Loops are used to enable higher frequency sample clocks. These clocks and sample pulses are periodically synchronized by one of the derived reference signals.

As shown in FIG. 4, a periodic superframe synchronization word 413, 423 (e.g., 2 bytes) is inserted into the first two bytes of the Physical Layer Operation Administration and Maintenance (PLOAM) message fields 403 to indicate the superframe time period has occurred. These bytes are normally set to zero. The presence of the unique sync bytes is detected by the Sync Detector Logic and a synchronization pulse is generated. The resultant sync pulse provides periodic retiming of the local sample frame generator. Additional message sequence numbers or time stamps can be inserted. For example, Network Time Protocol (NTP) messages are carried as PLOAM messages in the residual PLOAM bytes or as standard IP payload.

As a non-limiting example of the present invention, using a 2 kHz sampling system example, network messages can be sent every frame. However, a lower superframe or message rate of 500 Hz is preferred which will reduce the load on the receive processing systems. For a 500 Hz superframe, the superframe sync word would be inserted every fourth sample frame which is equal to every sixteenth iPON/iPEN frame. Each network message will contain four samples from each attached sensor. The superframe signal can be derived by monitoring the 8 KHz frame pulse, the 1 KHz reference, low order bits of the 30 bit ID Frame Number, and the presence of the unique sync word in the PLOAM fields. The superframe signal is used to align these four samples with all system Network Gateways to enable coherent distributed sensor processing. Following this example, the network message rate or superframe rate (500 Hz), iPON/iPEN frame rate (8 KHz), iPON/iPEN 1 KHz Reference, and ADC sample rate (2000 Hz) are all related. The superframe signal will align the ADC sample pulses and network message buffers every 2 ms. The superframe signal has a resolution of ±1 iPON/iPEN byte rate clock. For the 1244.16 MHz downlink rate, the byte rate clock is 155.52 MHz which has a 6.43 nanosecond period. The superframe signal and sensor sample resolution can be maintained to an accuracy of 12.86 nanoseconds. At the 2488.32 MHz downlink rate an accuracy of less than 10 nanoseconds can be achieved. This example is the simplest case in that the nested frames are related, however this is not required. Unrelated and asynchronous rates can be derived through multiplying Phase Lock Loops (PLL) to enable unrelated data acquisition.

Figure 2E:
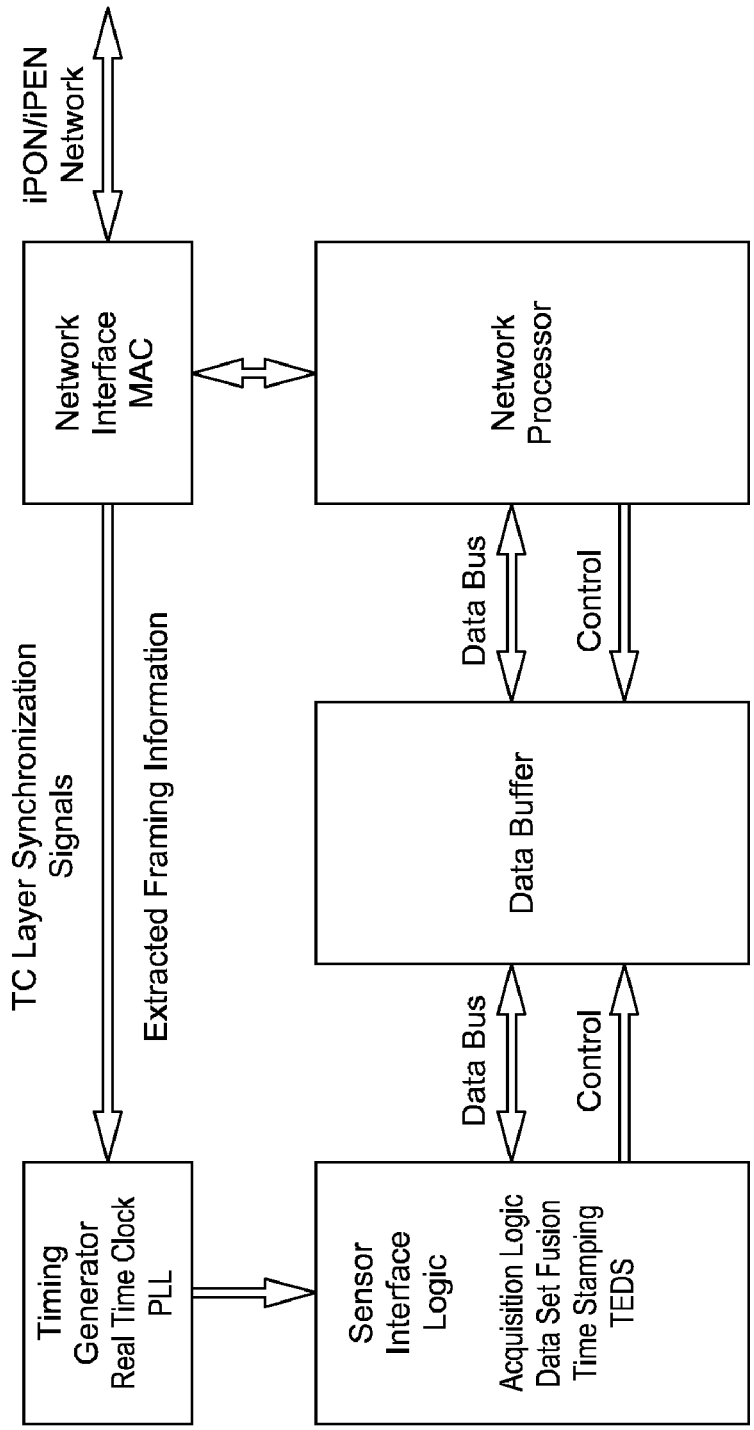
FIG. 2E is an exemplary block diagram illustrating the synchronization approach of the present invention.

The Network Gateway of this embodiment of the present invention comprises: a iPON\iPEN network interface, sensor interfaces, sensor synchronization logic, data acquisition logic and data buffering. Network Gateways multiplex data in burst-mode onto the common upstream wavelength in dynamically configured time slots or transmission containers (T-CONTs). The iPON/iPEN system architecture of the present invention provides a protocol agnostic open architecture for non-homogenous sensor types. FIG. 2E is an exemplary block diagram illustrating the synchronization approach of the present invention. The details of this approach are further discussed below with respect to FIG. 10.

To provide synchronous sampling, data fusion and network message buffer alignment each iPON/iPEN Network Gateway performs the following functions:
  i. receiving the iPON downstream signal and extracting an embedded PMD and TC Layer Frame Sync and byte rate clock to generate Analog-to-Digital Converter sample clocks or triggers for smart sensors;
  j. receiving iPON control bytes and extracting the proprietary superframe indicator, sequence number, and time tag information;
  k. using recovered PMD and TC Layer information to create synchronized data acquisition signals;
  l. acquiring sensor data and aligning data message buffers with a recovered system superframe;
  m. inserting message time stamp, sequence number, and local Network Gateway status information; and
  n. transmitting sensor data formatted as standard network messages.

The signal timing generator accepts the iPON/iPEN interface control signals and creates the required timing signals. In most cases phase-locked-loop (PLL) technology is necessary to create the exact frequencies required by the ADCs. The superframe signal re-aligns network buffers and ADC sampling signals. As discussed above, the network message rate and sensor-sampling rate are related. The data recovery function recovers data from the sensor group and writes that data to an aligned network message data buffer.

Once a network buffer is full, the data recovery block signals the network section to transmit the message. The buffer is formatted into a standard message, encapsulated using Generic Frame Procedure (GFP), and transmitted as packets over the iPON/iPEN network. A properly formatted message may include, but is not limited to, additional multi protocol network header and Ethernet protocol data.

Figure 5:
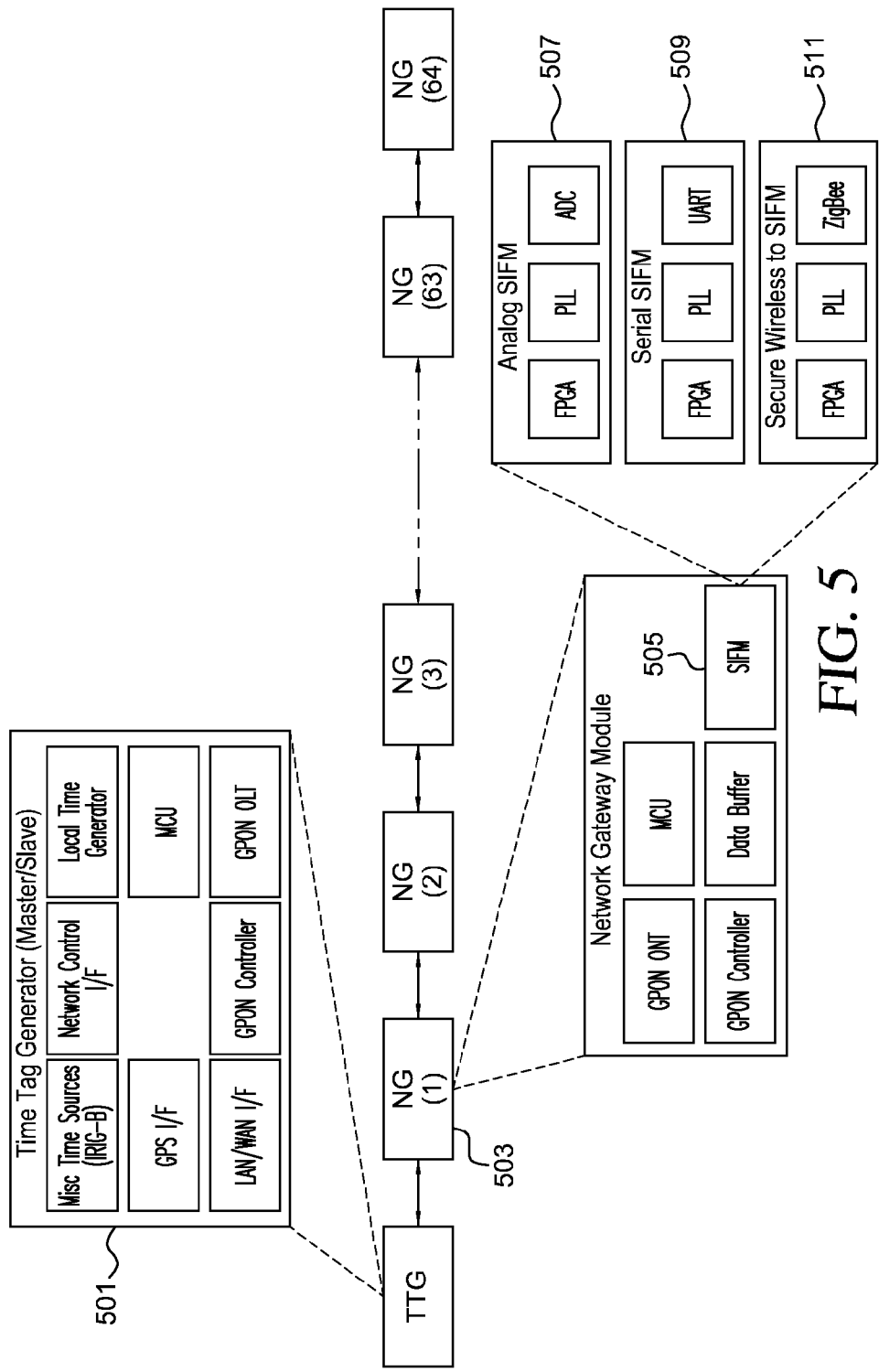
FIG. 5 shows an exemplary block diagram of an iPON/iPEN system architecture approach.

FIG. 5 shows an exemplary block diagram of a iPON/iPEN system architecture approach. As shown in FIG. 5, a Network Controller 501 (a.k.a. Optical Line Termination) provides timing information to a plurality of Network Gateway Modules 503 (NG). In addition, the NG modules further comprise a Network Interface Module 505 (SIFM/NIFM). The Sensor/Network Interface Module further comprises analog 507, digital or serial 509 and secure wireless 511 SIFMs/NIFMs.

Figure 6:
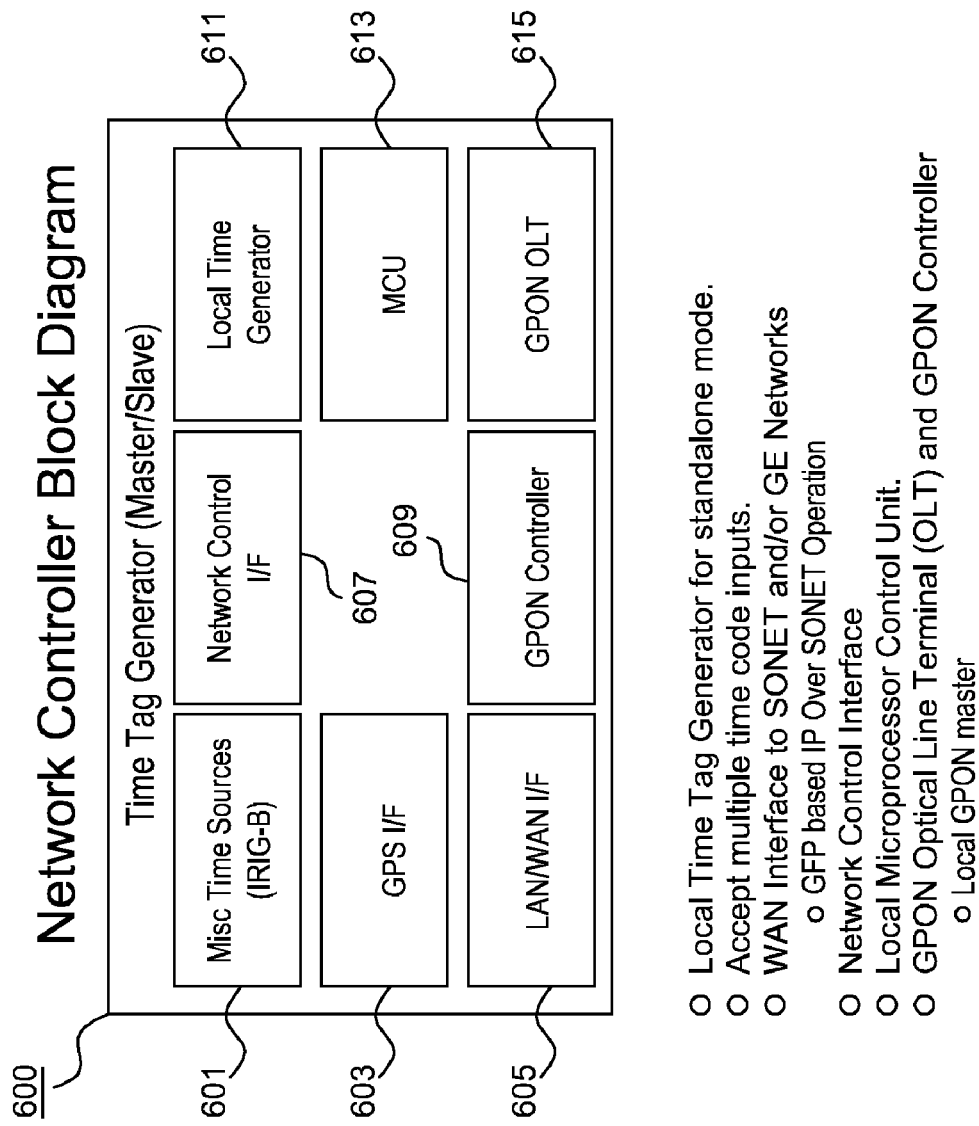
FIG. 6 shows an exemplary block diagram of a Network Controller of the present invention.

FIG. 6 shows an exemplary block diagram of a Network Controller of the present invention. As shown in FIG. 6, the Network Controller Module 600 further comprises miscellaneous time sources (e.g., IRIG-B) 601; a GPS interface 603; LAN/WAN interfaces 605; network control interfaces 607; a Gigabit iPON (GiPON) controller 609; a local time generator 611; a microcontroller unit 613; and a Gigabit iPON (GiPON) Optical Line Termination. In addition, the local time tag generator provides for a standalone mode; the TTG module accepts multiple time code inputs; the WAN interfaces to SONET and/or GE Networks (e.g., GFG based IP over SONET operation); and the GiPON devices provide for a local GiPON master capability.

Figure 7:
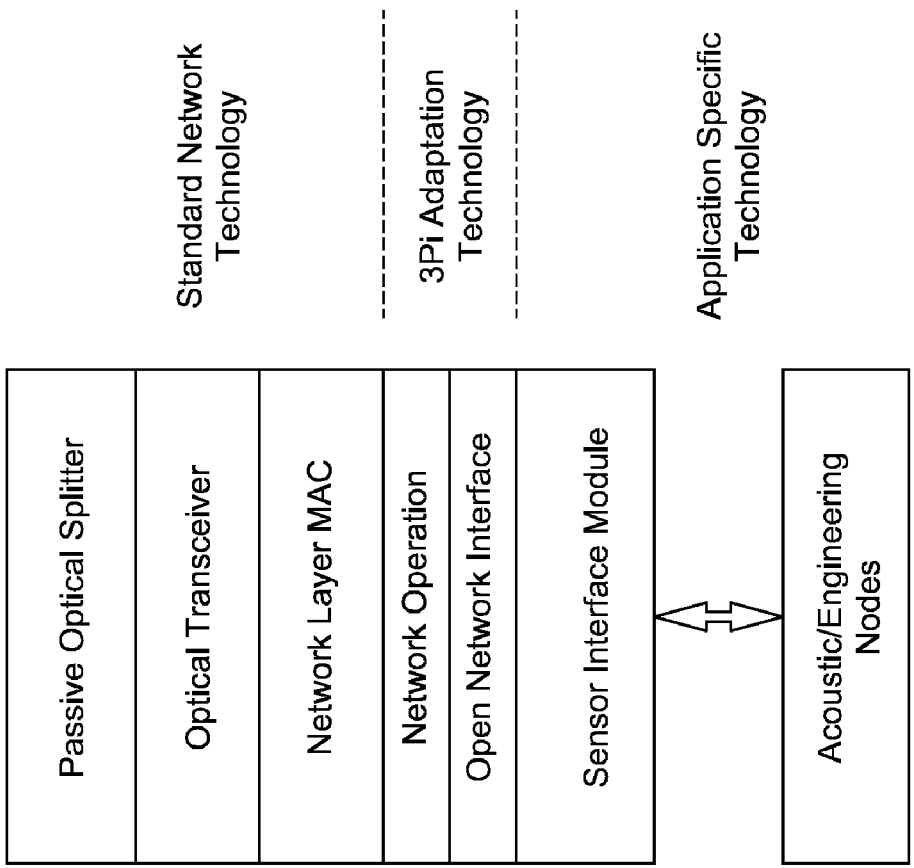
FIG. 7 illustrates an exemplary layered functional diagram of an iPON Network Gateway of the present invention.

FIG. 7 illustrates an exemplary layered functional diagram of a iPON Network Gateway of the present invention. As shown in FIG. 7, an embodiment of the present invention is a iPON NG comprising standard network technology, such as passive optical splitters, optical transceivers, a network layer MAC; adaptation technology of the present invention in the form of a network adaptation opens sensor interface; and application specific technology for a sensor interface module and acoustic/engineering nodes. The application specific technology may include, but is not limited to, FPGAs, PLDs, ROMs and PROMs.

Figure 8:
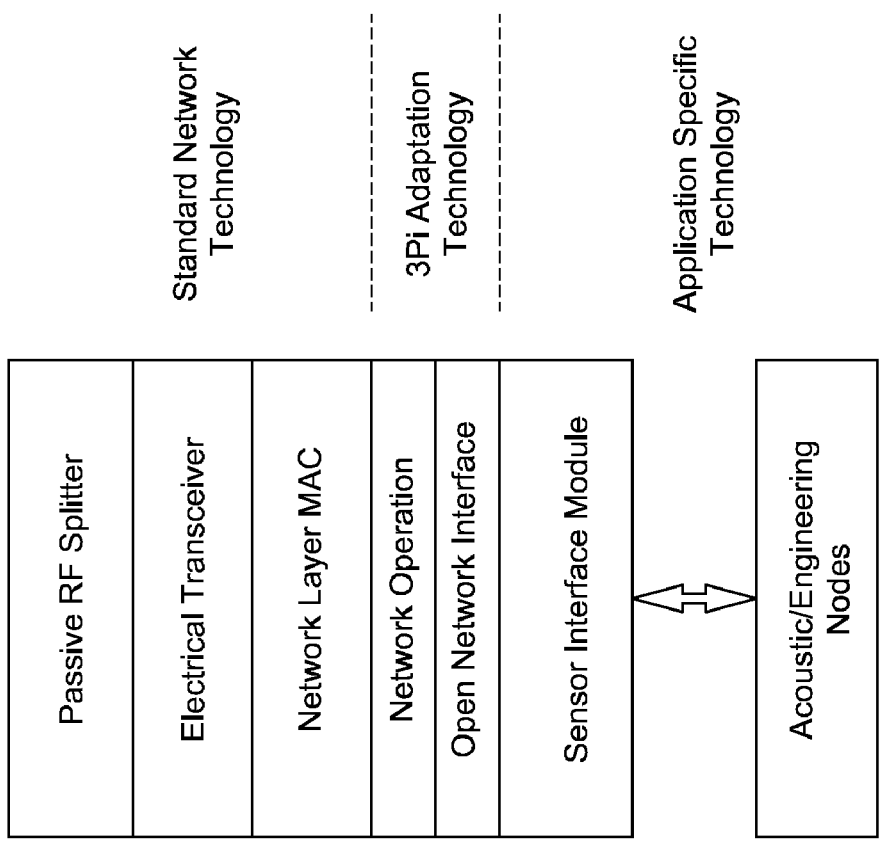
FIG. 8 illustrates an exemplary layered functional diagram of an iPEN Network Gateway of the present invention.

FIG. 8 illustrates an exemplary layered functional diagram of an iPEN Network Gateway of the present invention. As shown in FIG. 8, an embodiment of the present invention includes a iPEN NG comprising standard network technology, such as passive RF splitters, electrical transceivers, a network layer MAC; adaptation technology of the present invention in the form of a network adaptation opens sensor interfaces; and application specific technology for sensor interface modules and acoustic/engineering nodes. The application specific technology may include, but is not limited to: FPGAs, PLDs, ROMs and PROMs.

Figure 9:
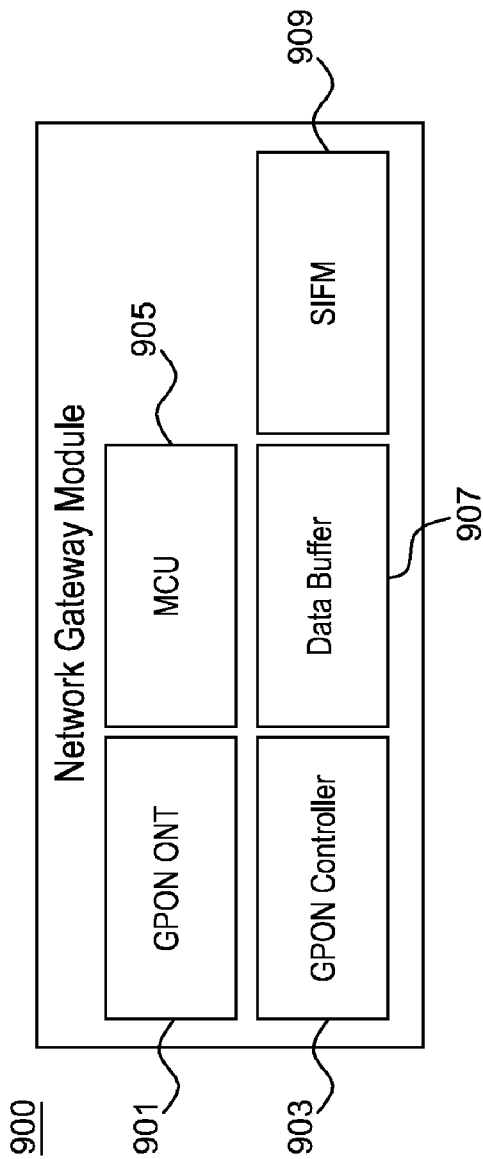
FIG. 9 illustrates an exemplary block diagram for an iPON/iPEN NG of the present invention.

The design of Network Gateways (NG) of the present invention is discussed in the following paragraphs. FIG. 9 illustrates an exemplary block diagram for a iPON/iPEN NG 900. The iPON/iPEN NG is comprised of a GPON Optical Network Termination 901 (ONT); a GiPON Controller 903; a microcontroller unit 905; a data buffer 907; and Sensor Network Interface Module (SIFM) functional sections. As discussed above, the NG is a specialized ONT. The GiPON Controller provides a MAC and the SIFM are sensor or application specific interface modules. The iPON/iPEN NG performs the functions of:
  o. bridging local communications back into the iPON/iPEN network;
  p. time tagging the data stream; and
  q. managing the Quality of Service (QoS) functions at the local level.

The Data Buffer 907 of FIG. 9 provides rate decoupling between the network interface and sensor interface functions. Dual ported, static or First-In-First-Out (FIFO) memories are generally used but other technologies are applicable. As a non-limiting example, Synchronous Dynamic Random Access Memory (SDRAM) provides a functionally equivalent solution to a FIFO at a much lower cost and power. The memories are divided into alternating read and write buffers or pages, where the network interface transmits the read page while the sensor interface fills the write page with newly acquired sensor data.

At the user side of the NC-TTG/OLT a commercial Ethernet switch provides data management and local dissemination. The iPON/iPEN has the ability to carry a wide range of data streams. Therefore, the transition to local communications protocols is completely transparent. Many payloads can be transported in a iPON/iPEN implementation which enables compatibility with legacy systems including, but not limited to: Synchronous Optical Network (SONET) payloads. Data Communication Channels (DCC) is used to embed data streams in the iPON/iPEN backbone.

Figure 10:
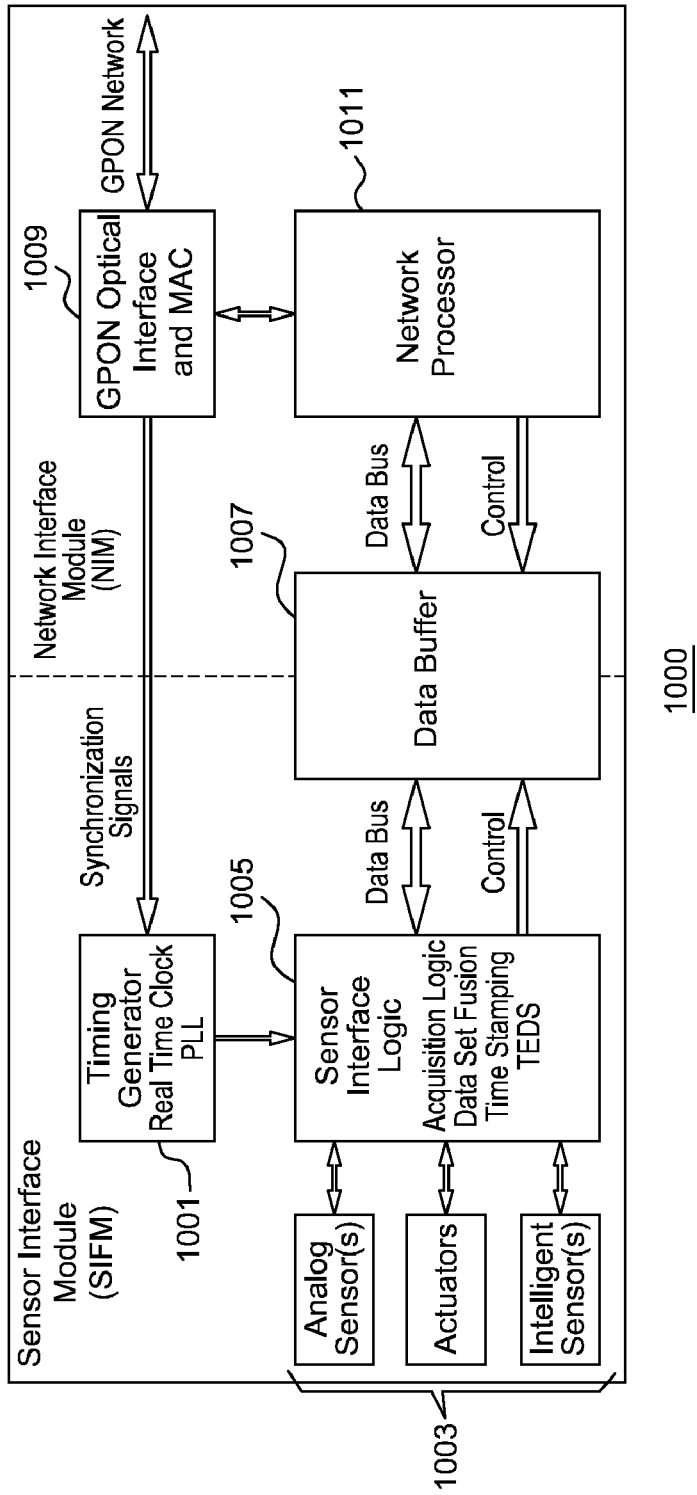
FIG. 10 is an exemplary detailed block diagram Network Gateway of the present invention.

FIG. 10 is an exemplary detailed block diagram Network Gateway of the present invention. The iPON physical layer supports single or multiple fiber optic implementations. The choice of the physical interface is dependent on at least one of the need for redundancy, distance between sensors, and required line rates. FIG. 10 presents the flow between the major functional elements introduced above. The clock and frame timing generator block is critical to data fusion, formatting, and synchronization. A local asynchronous master or phase locked slave clock controls the data acquisition operation. The clock operation is programmable to enable application specific rates. A locally generated or distributed time stamp will deterministically synchronize data samples. Real Time, Time-of-Day (TOD) information is available from multiple sources. An on-board Time-Code-Generator, embedded Real Time Clock, Satellite or other network distributed time stamp such as Network Time Protocol (NTP) can be selected as the source for integrated time synchronization data at the NC-TTG/OLT, distributed and recovered at each iPON NG.

As shown in FIG. 10, the timing generator 1001 includes a real-time clock and PLL signals. A plurality of sensors 1003 interface to the sensor interface logic 1005. The Data Buffer 1007 interfaces to both the sensor interface logic 1005 and the network processor 1011 through data and control busses. A GiPON Optical network interface and MAC 1009 interface to the GiPON Network and Network Processor 1011 and provides network access and synchronization signals to the timing generator 1001.

A typical SIFM analog sensor interface contains input protection and signal conditioning logic, the logic necessary to generate Analog-to-Digital Converter (ADC) control signals, and recover sensor data in various digital formats. The SIFM is responsible for receiving timing and synchronization signals and creating sensor group control signals such as clock, frame sync, and local telemetry if required.

Figure 11:
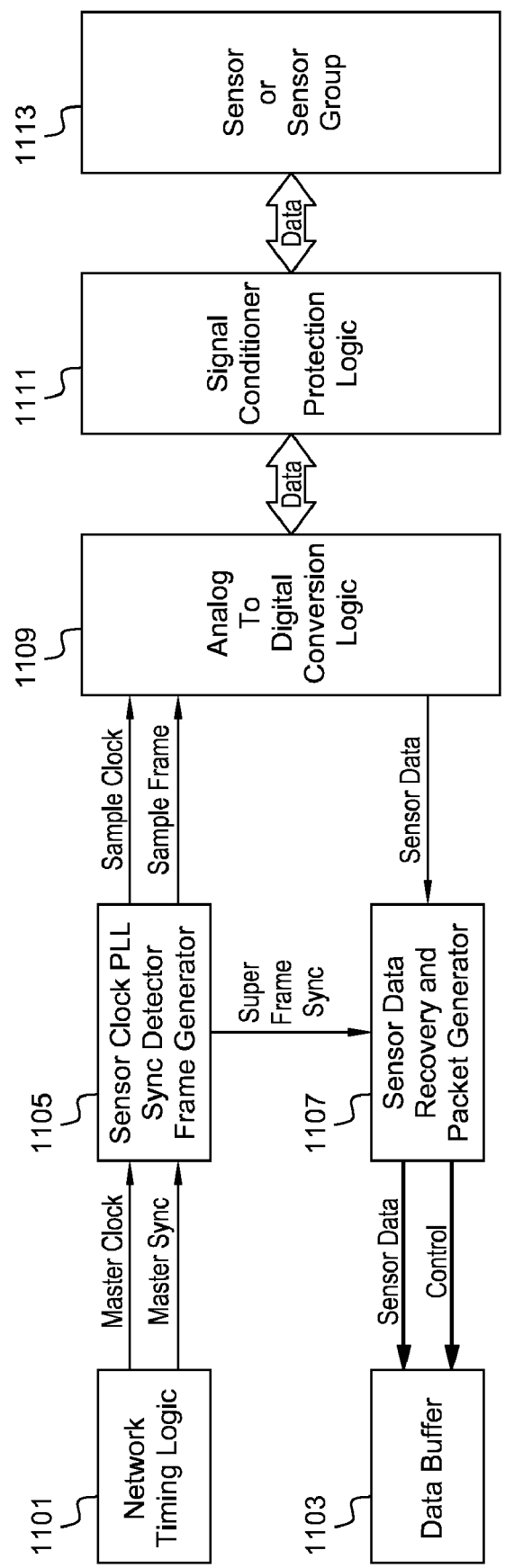
FIG. 11 is an exemplary functional block diagram of a typical analog sensor interface.

An exemplary functional block diagram of a typical analog sensor interface is shown in FIG. 11. The sensor interface 1105 receives the synchronization signals, generates the sensor clock and frame sync, and creates the necessary sensor or sensor group control signals. This section uses PLL technology to create the proper clock frequencies from the networked recovered master clock. The sensor interface data recovery section 1107 recovers the sensor or sensor group data. Recovered data are written to the gateway data buffer 1103 to form time stamped packet data. The super frame synchronization flag aligns data buffers when multiple data samples are sent in a single network message. When the network buffer is full the sensor interface 1105 signals the network interface 1101 to transmit the network buffer and the read and write buffers are swapped. Additionally, the interface section 1101 provides serial links and other input ports. Each sensor is individually and uniquely configurable through their dedicated interface links. This logic is also easily implemented using, for example, programmable logic technology such as FPGAs and PLDs.

Figure 12:
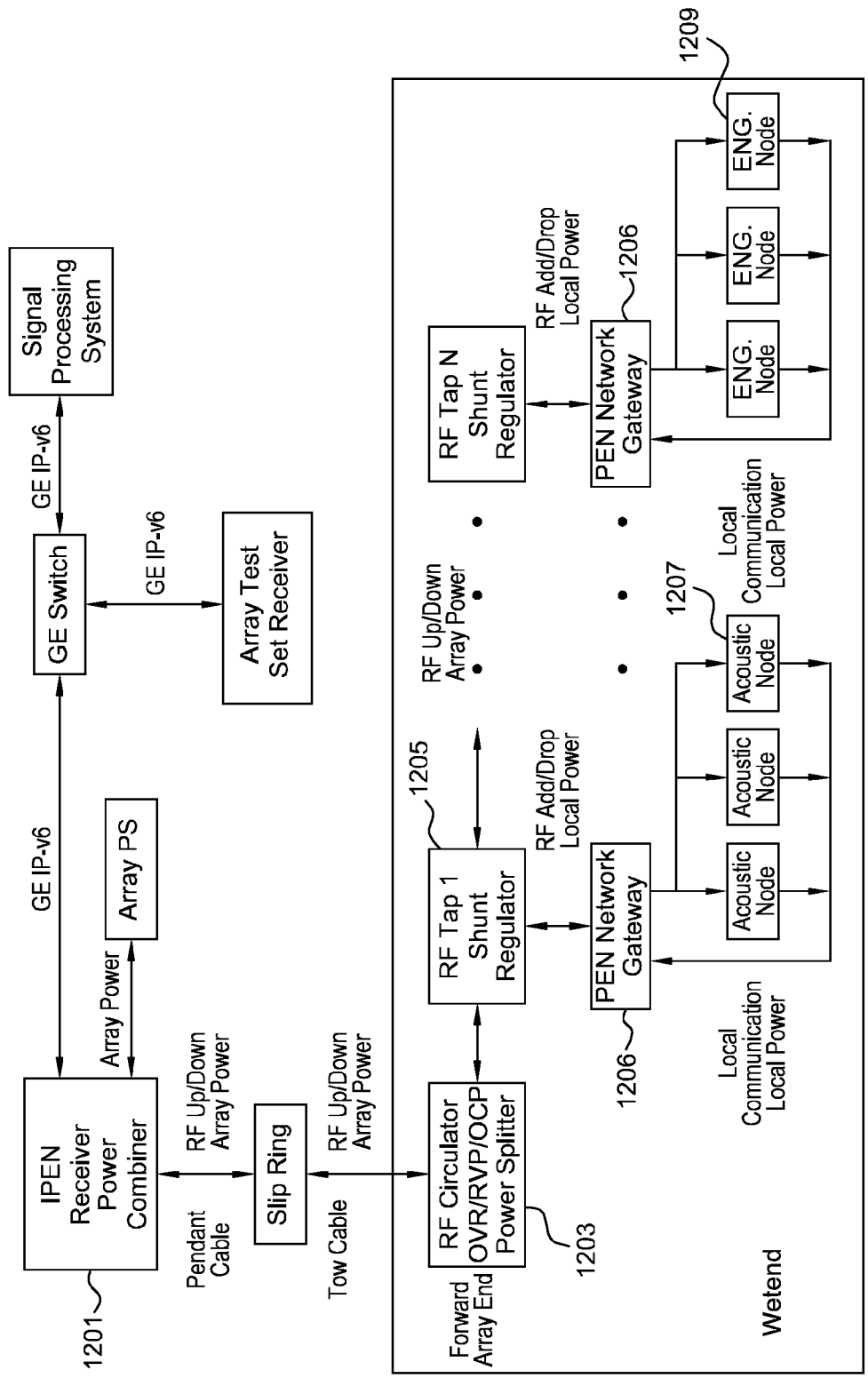
FIG. 12 illustrates an exemplary block diagram of the inverted Passive Electrical Network (iPEN) system architecture.

FIG. 12 illustrates an exemplary block diagram of the inverted Passive Electrical Network (iPEN) system architecture. The iPEN system architecture of FIG. 12 is comprised of six (6) unique elements: the iPEN Receiver 1201, RF Circulators 1203, RF Tap Shunts 1205, iPEN Network Gateways 1206, Acoustic Sensor Nodes 1207, and Engineering Sensor Nodes 1209. The iPEN is directed toward use when a copper medium is desired. A clear distinction between the optical media discussed above and the copper media is the use of lightwaves versus electrical signals. The optical version iPON clearly has an aggregate bandwidth advantage. It can support symmetrical and asymmetrical data rates up to 2.5 Gbps on a single fiber per laser color.

However, often one doesn't need the full bandwidth downstream but the higher rates have the advantage of tighter clock tolerance and jitter which enables maintaining very low sensor to sensor phase error specifications. In data fusion applications, 90% of the data flows upstream from the end users which is the inverse of industry applications. In addition, fiber is not always available or affordable for all applications so, with the same passive tap approach of iPON, iPEN includes no inline active electronics in an electrical version of the concepts which operates at lower data rates, lower power and lower costs.

Figure 13:
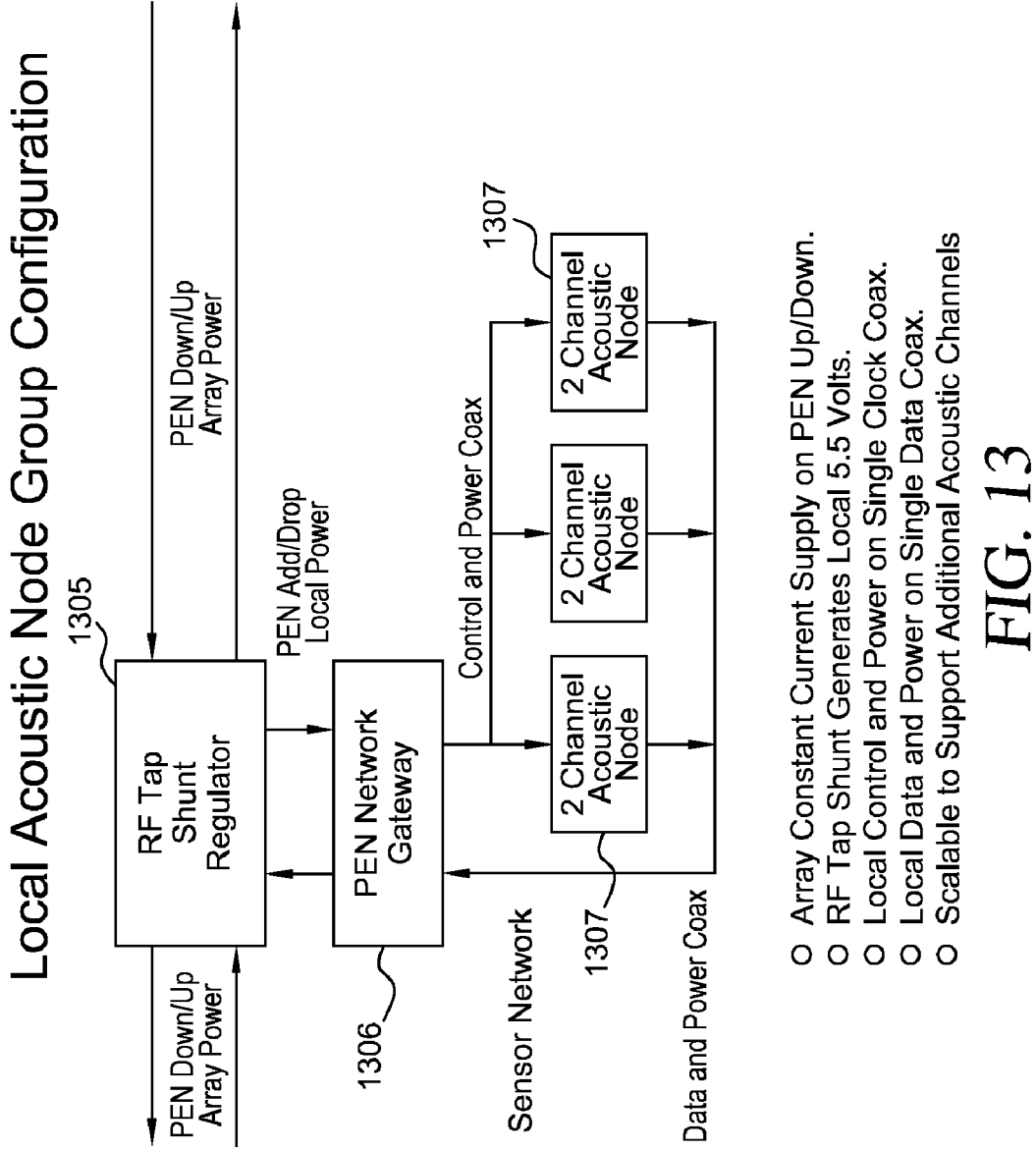
FIG. 13 illustrates an exemplary embodiment of an iPEN two level architecture that consist of a dual coax iPEN end-to-end system network and a dual coax local or sensor network.

FIG. 13 illustrates an exemplary embodiment of an iPEN two level architecture that consist of a dual coax iPEN end-to-end system network and a dual coax local or sensor network. Array Acoustic Modules (AM) are constructed of local groups of six (6) or more channels or three (3) or more two (2) channel Acoustic Sensor nodes 1307, as shown in FIG. 13. The iPEN system network provides an array with constant current power distribution on the dual coax infrastructure. The Local Network distributes constant voltage to the local sensor node groups on the Control and Data coaxes.

Further, the iPEN Receiver 1201, as shown in FIG. 12, provides the RF electronics for the downstream data channel and receive path that receives the upstream data signals from each iPEN Network Gateway 1306 shown in FIG. 13. To achieve high data rates and minimize cable attenuation, Quadrature Phase Shift Keying (QPSK) and Quadrature Amplitude Modulation (QAM) are used for the downstream and upstream paths, respectively. The modulated signals are placed on low-frequency carrier channels of 12 and 8 MHz. Since attenuation is a strong function of carrier frequency, these relatively low carrier frequencies greatly extend the reach of the signals may travel and eliminate the need for in-line amplifiers. By comparison, cable TV systems use carrier frequency channels up to 860 MHz, requiring in-line amplifiers every 500 feet.

Figure 14:
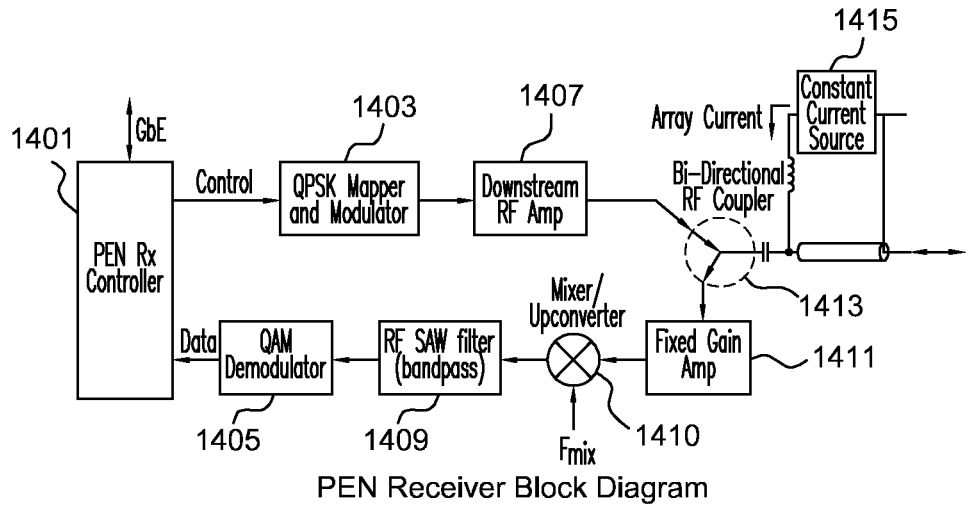
FIG. 14 illustrates an exemplary block diagram of an iPEN Receiver.

FIG. 14 illustrates an exemplary block diagram of a iPEN Receiver 1401. In FIG. 14, the QPSK modulated data is sent to a downstream RF amplifier 1407 and coupled onto the coax cable via a bi-directional coupler 1413. The bi-directional RF coupler 1413 isolates the downstream signal from the upstream signal path by 55-60 dB. The upstream signals are passed from the bi-directional coupler 1413 to an amplifier 1411, mixed with a reference oscillator 1410 and filtered 1409 to deliver a clean signal to the QAM demodulator 1405. The QAM demodulator 1405 delivers the sensor data to the iPEN Receiver Controller 1401 (microprocessor) which provides formatting and framing of the data for delivery to the shipboard receiver. The QAM demodulator 1405 is capable of receiving more than 30 Mbps data streams from the iPEN Network Gateways. The downstream data generated by the iPEN Receiver Controller 1401 consists of a periodic transmission of a 32-bit timestamp, a mapping of iPEN Network Gateway transmit timeslots, and control commands targeted to specific gateways. The timestamp is used by the iPEN Gateways for array-wide sensor synchronization in addition to timing transmissions.

Gateway commands consist of transmits amplitude control, calibration mode setting, and sample rate and sample resolution, mode selection (e.g., operation, calibration, and fault localization). The downstream data channel can also be used to perform module firmware upgrades. In particular, FIG. 14 presents a block diagram of a iPEN Receiver that is located inboard on a submarine platform.

Figure 15:
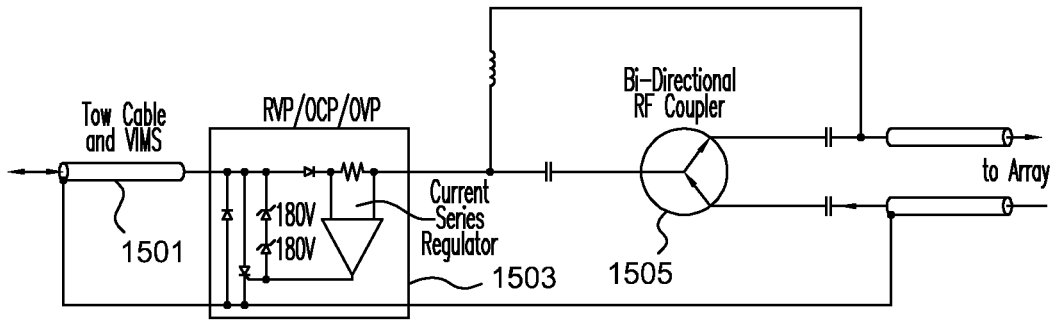
FIG. 15 is an exemplary block diagram of an RF Circulator.

FIG. 15 is an exemplary block diagram of an RF Circulator 1500 of the present invention. In the Forward Interface Module (FIM) at the end of the tow cable and Vibration Isolation Modules (VIMS), the single coax is split into an upstream and downstream pair of coax cables in the RF Circulator Node. The required tow cables both consist of a single coax to the array. The RF circulator consists of a bi-directional coupler 1505, identical to the coupler in the iPEN Receiver. The coupler 1505 is a passive device that isolates the upstream signal from the downstream so that the CNR at the iPEN Gateways is maximized.

At the RF Circulator, the downstream supply current is transferred from the tow cable coax center conductor to the downstream coax shield. The return current from the entire array is passed through the upstream coax shield and connected in this node to the tow cable shield. Array Over-Voltage Protection (OVP), Reverse Voltage Protection (RVP), and Over-Current-Protection 1503 (OCP) are provided to prevent damage to the array under any of these conditions. The OVP is set to provide protection if the input voltage exceeds 300 V. The over-voltage protection function is provided, for example, by high-current Zener diodes. The array is protected against reversed polarity at the power supply through high voltage diodes placed in-line in the forward and return current paths. The array OCP is set to short the input if array input current exceeds 3 amps but can be set to appropriate current during the system design phase. The OCP is provided by monitoring the voltage across a current sense resistor and firing an SCR to short the array input.

Figure 16:
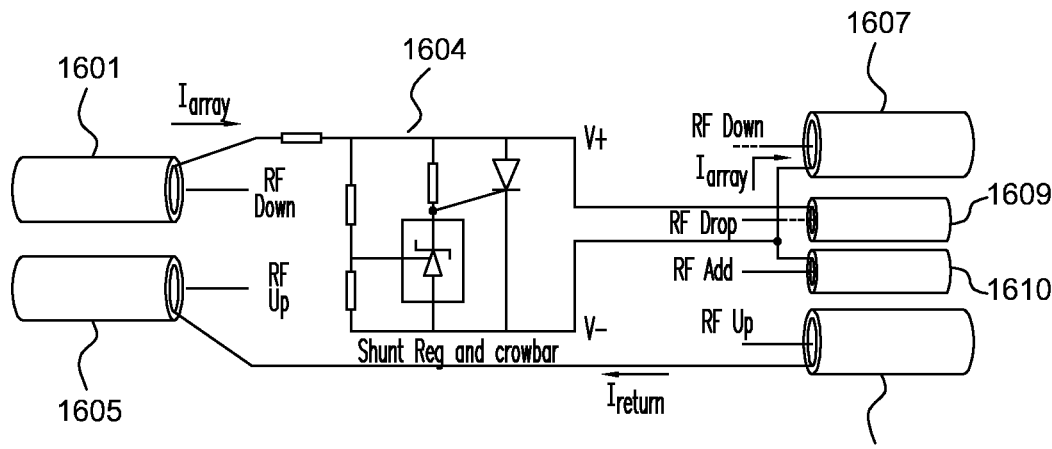
FIG. 16 illustrates an exemplary block diagram of the RF Tap Shunt nodes of the present invention.
Figure 17:
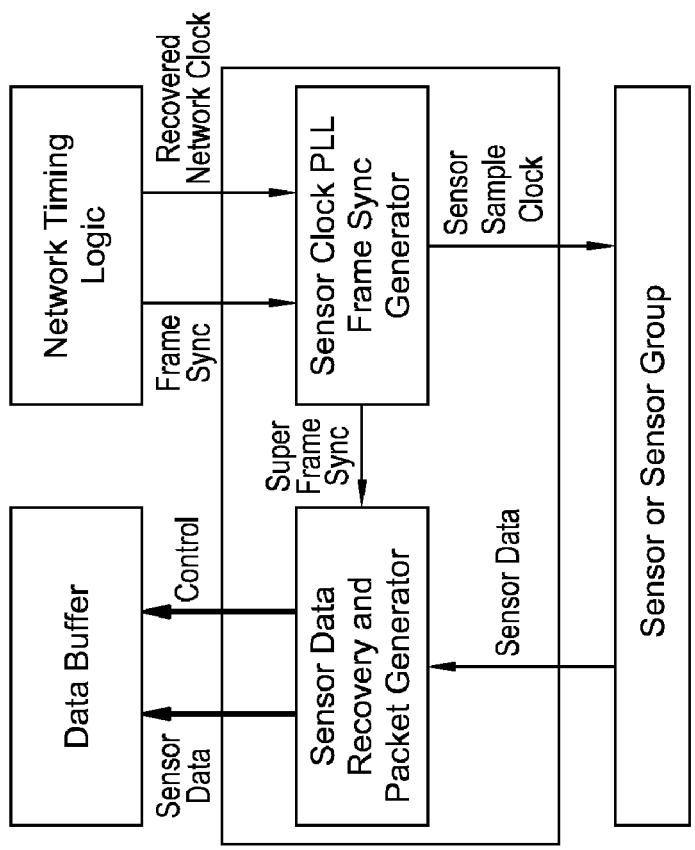
FIG. 17 illustrates an exemplary block diagram of a digital Sensor Interface Module of the present invention.

FIG. 16 illustrates an exemplary block diagram of the RF Tap Shunt nodes of the present invention. For every iPEN Network Gateway and Acoustic or Engineering Sensor Node group, there is an accompanying RF Tap Shunt node. The RF Tap Shunt nodes of FIG. 16 drop 1% of the downstream RF power to the iPEN Network Gateways, and likewise provide an upstream tap that allows the iPEN Network Gateways to add its transmission to the upstream mainline. The RF directional couplers 1601, 1605, 1607, 1608 are used to divide the power and are completely passive devices, keeping the mainline paths free of active devices. The thru-loss of the mainline traffic is typically 0.4 dB for a 1% coupler. In addition to providing RF taps, the Tap Shunt node also provides local power regulation for the local iPEN Network Gateway and its accompanying sensor nodes.

Figure 18:
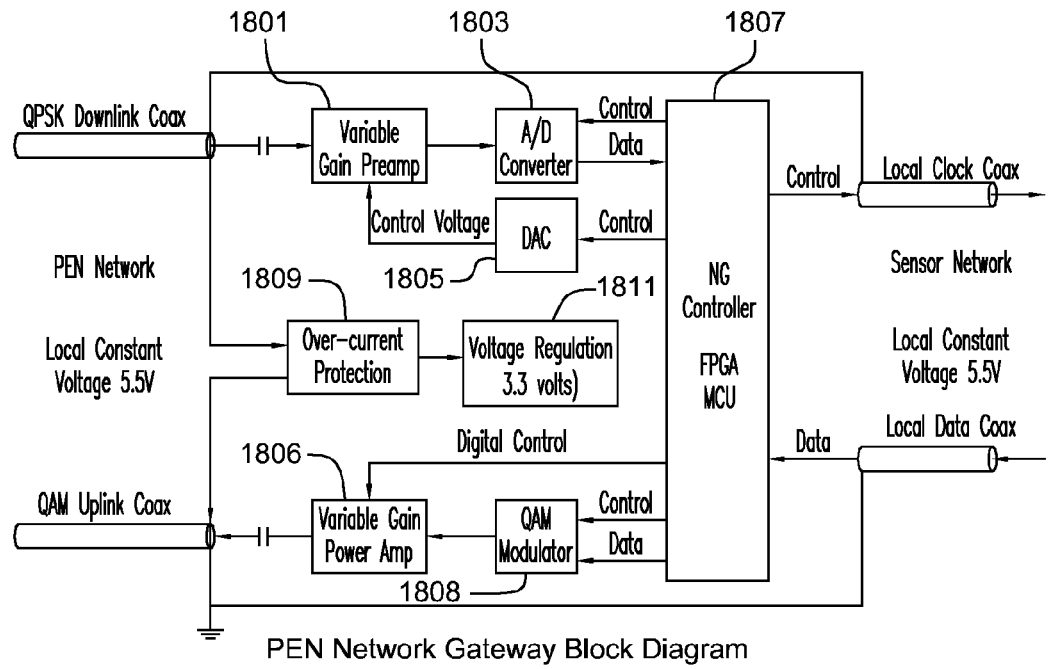
FIG. 18 illustrates an exemplary block diagram of an iPEN Network Gateway.

FIG. 18 illustrates an exemplary block diagram of an iPEN Network Gateway. The iPEN Network Gateway contains the functional equivalent of a traditional cable modem. The primary difference from a traditional cable modem is that the RF tuner has been eliminated because the iPEN system uses a single downstream carrier frequency. A traditional modem requires the tuner to filter out RF channels carrying analog and digital TV signals and additional cable modem traffic. The tuner of a traditional modem typically takes a channel between 88 and 860 MHz and translates it to 44 MHz, as the QAM demodulator expects a 44 MHz (or lower) intermediate frequency (IF) output from the tuner. The implementation chosen for this sonar application utilizes an adaptation of the DOCSIS architecture which generates an 8 MHz QPSK modulated synchronous downlink signal to provide synchronization and control information to the ENGs.

The receive path of the iPEN NG consists of a variable gain pre-amplifier 1801, Analog-to-Digital Converter 1803, and QPSK demodulator/decoder which is implemented in the iPEN NG Controller FPGA 1807 containing the Transmission Convergence (TC) and Media Access Controller (MAC) layers of the downlink protocol. The transmit path of the iPEN NG consists of a QAM modulator 1808 and an upstream amplifier 1806. The upstream carrier frequency is selectable and is traditionally between 5 and 40 MHz. Since the RF attenuation increases with carrier frequency, RF power budgeting dictates that we use the lowest frequencies allowed. As the upstream data rate is the most critical in this application, we will transmit the upstream data on a channel centered at least at 8 MHz. The channels are 6 MHz wide, this puts the lower edge right at the minimum 5 MHz. Additional functions of the NG Controller FPGA 1807 includes a digital phase-locked loop that locks to a sync signal transmitted by the iPEN Receiver Unit. The NG Controller FPGA 1807 is also responsible for providing timing for the A/D converters and collecting data from the Acoustic Sensor and Engineering Sensor Nodes. A small microcontroller (e.g., PIC18) provides the IP protocol stack and SNMP agent allowing for easy individual iPEN NG monitoring and control.

As a non-limiting example, the iPEN system architecture will provide for acquisition of acoustic data from piezoelectric hydrophones. The system will also support a minimum of four Non-acoustic suites. Thirty six (36) iPEN Network Gateways are distributed throughout the array with Acoustic and Non-acoustic Sensor Nodes connected in small groups to assemble a sonar towed array. The iPEN Network Gateway is essentially a network bridge element that bridges the high speed iPEN backbone to the low level Sensor Network. The Sensor Network is a short reach, low power, low cost telemetry scheme that maintains the simple reliable iPEN NG system architecture utilizing failsafe driver and receiver designs on a common clock and data coax.

The iPEN NG element provides the following capabilities:
r. Single ended 12 MHz QPSK Downlink Receiver Demodulator. The QPSK modulated downlink is received from the passive RF Tap Shunt. Network timing, control, calibration, and configuration messages are received from an external or shipboard receiver for processing. All messages may be iPv6 packet based and fully compliant with the Common Specification for Submarine Sonar, Combat Control and Architecture Systems or utilize other well known message formats.
s. Single ended, 8 MHz carrier frequency, QAM Uplink Transmitter Modulator. The 8 MHz uplink carrier has been selected for the sonar application based on the aggregate bandwidth and overall system cable length. It should be noted that the uplink carrier frequency is programmable in system to over 20 additional standard carrier channels ranging from 6 to 88 MHz. Each carrier channel is capable of supporting 30 Mbps transfers which makes the iPEN Telemetry System highly scalable to many array configurations and applications. The QAM 64 modulated uplink is transmitted to the passive RF Tap Shunt for multiplexing onto the iPEN backbone. Sensor data samples are packed into network messages at 24, 16, or 12 bit resolutions based on iPEN NG configuration. The sample word width control can only be set at the factory or may be field accessible. All messages are IPv6 packet based and fully compliant with the Common Specification for Submarine Sonar, Combat Control and Architecture Systems or other well known message formats.
t. Local Low Drop Out (LDO) voltage regulator generates highly isolated local logic voltages from the 5.5 volt shunt regulator voltage supplied on the shields of the iPEN uplink and downlink coaxes from the RF Tap Shunt. The 5.5 volts is passed through to the shields of the low level Sensor Network telemetry coaxes connected to the Acoustic and Engineering Sensors Nodes.
u. Network timing and synchronization logic recovers array timing and control information from the iPEN downlink. Phase Lock Loop (PLL) technology is utilized to recover a stable clock to time the iPEN NG activity and generate the Acoustic and Engineering Sensor sample clock.

v. Single ended encoded Sensor Network local clock coax generator provides timing and control to the Acoustic and Engineering Sensor Nodes. Sample frame and synchronous clock is provided as well as payload to enable download and upload of calibration coefficients to and from the sensors, and to initiate normal, calibration and fault-detect modes. Sensor nodes utilize failsafe receivers to tap the common clock coax.

w. Single ended encoded Sensor Network local data coax receiver recovers sensor data and status from the Acoustic and Engineering Sensor Nodes. Sensor nodes use a synchronous TDM scheme and failsafe driver design to transmit data to the ENG on a common data coax.

x. Data Formatter recovers sensor data and builds standard iPv6 network messages or other well know message formats and encapsulates them into an MPEG frame for transmission of the DOCSIS based iPEN network. A double buffered approach enables the data recovery logic to receive and pack incoming samples in one buffer while the ENG Controller FPGA and Microprocessor formats and transmits messages from a second buffer. Every super frame the buffers are swapped and the process continues.

The iPEN Network Gateways of the present invention utilizes the DOCSIS 2.0 data-over-cable architecture. This architecture is attractive because of its point-to-multipoint-over-coax capability. Cable modem technology has advanced rapidly over the past few years and has been well-directed by the DOCSIS standards. Using this technology in the present invention provides a high level of interoperability with cable modems, highly integrated ICs, and a rapidly evolving path to higher bandwidth systems. DOCSIS 2.0 currently specifies greater than 30 Mbps shared upstream bandwidth.

Figure 19:
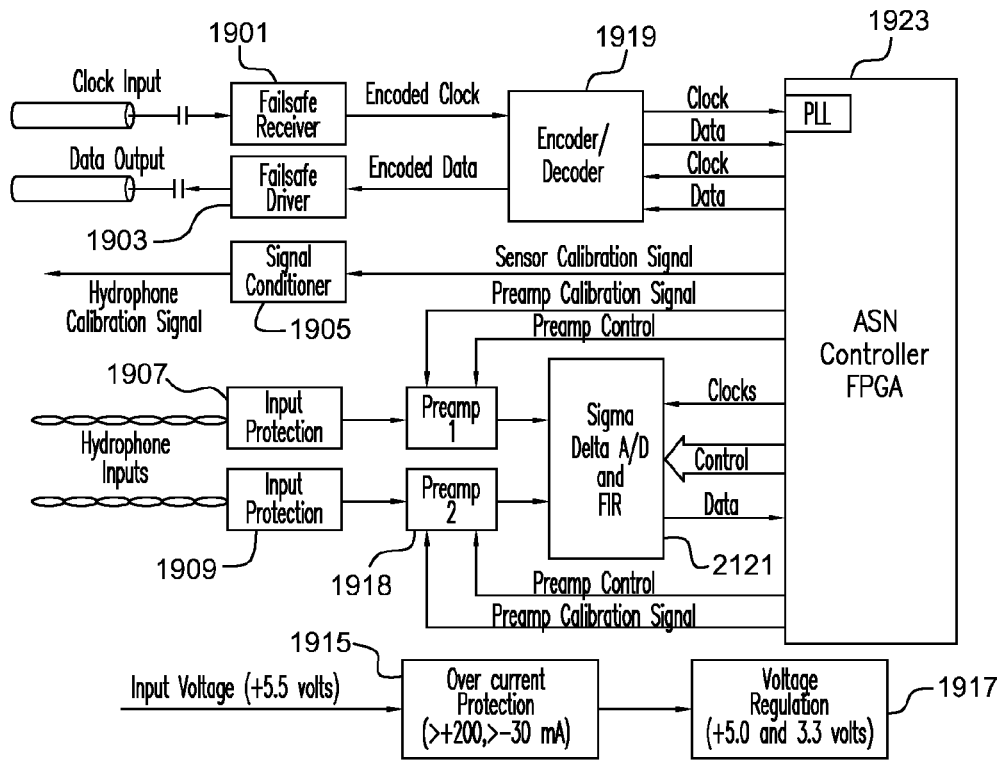
FIG. 19 is an exemplary block diagram of the Acoustic Sensor Node (ASN) of the present invention.

FIG. 19 is an exemplary block diagram of the Acoustic Sensor Node (ASN) of the present invention. The iPEN system architecture will provide for acquisition of acoustic data from a plurality of piezoelectric sensors. Each ASN is a 2 channel acoustic data acquisition element which contains:

y. Input protection 1907, 1909 on each channel capable of transients without damaging components of +265 dB// µPa for 2 milliseconds with a 1-millisecond rise time. The ASN will recover to normal operating mode within 1 second from the transient overload cessation. Additionally the input protection circuitry 1907, 1909 is designed to withstand, without component damage, continuous wave (CW) inputs of +190 dB//µPa for a minimum of 3 seconds. The ASN will completely recover from the cessation of the CW overload in 200 milliseconds. The input protection circuit is based on a successfully tested field proven high-performance protection diode scheme that is implemented in many of the fleet's arrays today.

z. Programmable gain Preamp electronics 1911, 1913 provide the entire analog signal conditioning functions required between the hydrophone group and the analog-to-digital (A/D) converter 1919. The ASN may utilize a commercially available monolithic signal conditioner designed specifically for the towed array applications. Four (4) dynamically controlled gain steps are provided in 6 dB increments (0, 6, 12, and 18). Unique gain setting can be controlled at a granularity of 6 channels which is determined by the number of ASNs connected to the local Network Gateway. The Preamp 1911, 1913 also provides individual calibration signal input for each acoustic channel.

aa. The monolithic ASN Preamps 1911, 1913 are tested and screened for compliance for channel-to-channel:

i. Gain matching of +/−0.5 dB across the frequency bands of interest.

ii. Phase matching of +/−3 degrees across the frequency bands of interest.

iii. Input Resistance at the hydrophone input terminal variance of less than 5% of the array telemetry kit mean.

bb. Two channel integrated 24 bit Analog-to-Digital (A/D) 1919 signal conversion and Finite Impulse Response (FIR) Filter. The A/D converter and FIR filter is a Commercial-Off-The-Shelf (COTS) monolithic device used in high volume in the audio industry. Data sample reduction to 16 and 12 bit formats is performed in the Network Gateway where IPv6 packets may be formed and encapsulated into MPEG frames for transmission on the iPEN Network. The acoustic sample size configuration must be performed by a system administrator and is stored in non-volatile memory at the Network Gateway. Sample rates up to 25 KHz are supported and dynamically allocated in system. The ASN sample rate selection is a command driven configuration which is enabled at a granularity defined by the number of ASNs connected to each uniquely addressable Network Gateway. Nested acoustic apertures can run at independent fully synchronized sample rates. The only limitation is that the rates are integer multiples of each other.

cc. Local Low Drop Out (LDO) voltage regulator 1917 generates highly isolated local logic voltages from the 5.5 volt shunt regulator voltage supplied on the shields of the Sensor Network clock and data coaxes from the iPEN NG. A two level nested regulator scheme provides additional isolation between analog and digital supplies.

dd. The ASN supports 3 modes of operation:
i. Normal Mode: Acoustic data transmitted to the shipboard receiver.
ii. Calibration Mode: Command enabled Acoustic signal to the Preamp or Hydrophone Group.
iii. Fault Localization Mode: Command enabled test pattern and extended status mode.

ee. Command driven configurable two level calibration generator. The ASN Controller FPGA 1923 is capable of generating four in band calibration tones and a $2^{23}$ Pseudo-Random Noise signal that are synchronized to the acoustic sample clock and telemetry super frame. Standard tones are Fs/2, Fs/4, Fs/8, and Fs/16, where Fs are the selected sample rate of the ASN. Other signals are available through firmware image enhancements based on customer and system requirements. Left and Right channel calibration signals are provided to the Preamp electronics. A separate signal conditioned calibration signal is also available for routing to the pad at the hydrophone group if desired by the array manufacturer.

ff. Command Driven Performance Monitoring and Fault Location (PMFL) enables fixed data patterns to be inserted into the acoustic data fields for a group of ASNs. ASN internal test patterns are enabled at a granularity defined by the number of ASNs connected to each uniquely addressable Network Gateway. This feature and the ability to generate two level calibration signals to the ASN individual Preamp and hydrophone groups enables fault isolation to the lowest element level.

Figure 20:
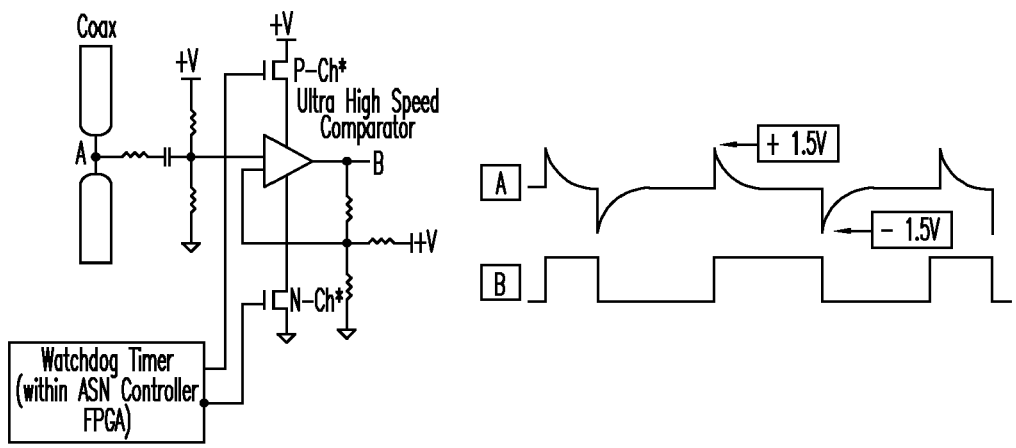
FIG. 20 illustrates an exemplary block diagram of the Failsafe Receiver design with input to output signals.

FIG. 20 illustrates an exemplary block diagram of the Failsafe Receiver design with input to output signals. This is a field proven design which enables the scalable iPEN Low Level Telemetry architecture. As shown in FIG. 19, Failsafe Cable Line Receiver 2001 provides the interface to the common clock coax. High-speed comparator based design with hysteresis recovers control and timing data from differentiated edges generated by the Network Gateway. The receiver 2001 has redundant failsafe mechanisms. A Watchdog Timer internal to the ASN Controller FPGA 1923 floats inactive receivers. Additionally, the input resistors isolate failed receiver from common coax.

Figure 21:
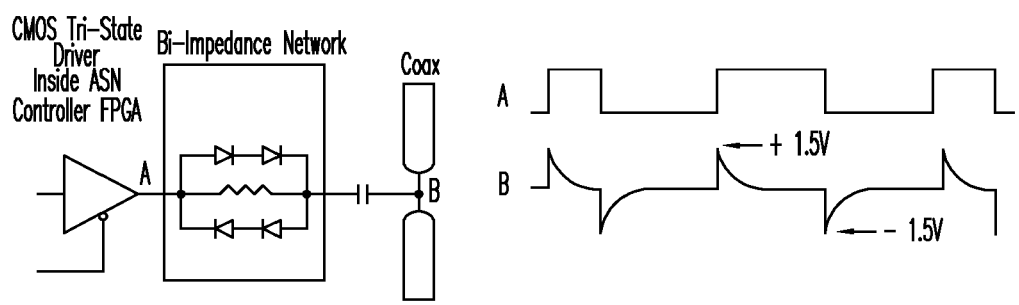
FIG. 21 illustrates an exemplary block diagram of the Failsafe Line Drive with input to output signals.

FIG. 21 illustrates an exemplary block diagram of the Failsafe Line Drive with input to output signals. This is a field proven design which enables the scalable iPEN Low Level Telemetry architecture. Failsafe Cable Line Driver 2103 drives acoustic data and local status onto the common data coax in a simple synchronous Time Division Multiplexed (TDM) scheme through a unique Bi-Impedance Network 2103. The Bi-Impedance Network enables a CMOS Tri-state Driver internal to the ASN Controller FPGA to drive data edges onto the coax. Coax data traveling past the local driver is undisturbed even during failed conditions. The driver is disabled or tri-stated between transmissions and when the ASN is not locked to the clock coax input. Thus, open circuit conditions leave the ASN in a passive non-intrusive state. Stuck or failed CMOS drivers, either High or Low do not degrade passing data. The diodes provide a +/−1.5 volt high impedance window. Even shorted diodes only slightly clip passing coax data. The resistor sets the DC bias on the coupling capacitor. Differentiated data has zero DC content independent of the data bias.

gg. ADC Performance: The Cirrus Logic CS5381 dual channel Sigma Delta Analog-to-Digital Converter (A-D) provides channel to channel isolation of 110 dB. Acoustic channels are grouped in pairs based on the stereo A-D devices. Local LDO voltage regulators provide additional isolation of 75 dB from input voltage contamination. The CS5381 A-D converter provides flat response across the passband of +/−0.035 dB. The anti-alias filter set at 0.47 Fs and provides 95 dB of attenuation. The anti-alias filter rolls off at a rate in excess of 12 dB/octave at 0.6 Fs. The dynamic range of the ASN's A-D converter is 120 dB.

Figure 22:
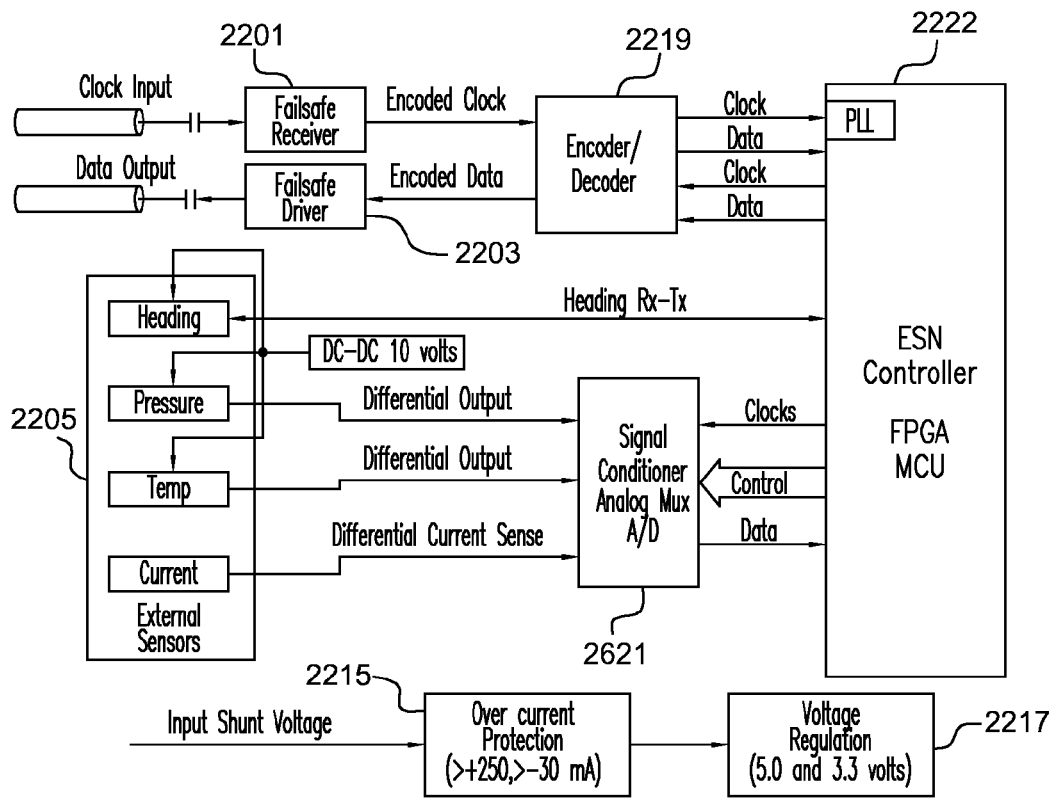
FIG. 22 illustrates an exemplary embodiment of an Engineering Sensor Node (ESN) of the present invention.

FIG. 22 illustrates an exemplary embodiment of an Engineering Sensor Node (ESN) of the present invention that is a four channel non-acoustic data acquisition element which comprises:

hh. Differential pressure sensor input with signal conditioning.

ii. Pressure sensor excitation voltage output of 10.0 Volts DC±10% @ 7-10 ma.

jj. Differential temperature sensor input with signal conditioning.

kk. Temperature sensor excitation voltage output of 10.0 Volts DC±10% @ 7-10 ma.

ll. Differential Current Sensor input with signal conditioning. Measured across an external resistor usually between (0.1-1Ω). The ESN internally applies correction factors to provide accurate current measurements. In a constant current based array, measuring current forward and aft enables the shipboard receiver to detect short circuits with in the array. Array voltage can be measured at the array power supply which can isolate Shunt Regulators at the RF Tap Shunts that have gone into crowbar. The overall array voltage will decrease incrementally by $V_{shunt}$ for each RF Tap Shunt that has gone off line.

mm. Heading sensor interface port for control and data acquisition. An asynchronous serial port is provided for connection to the Heading sensor other interfaces are supported based on final sensor selection.

nn. The ESN supports 3 modes of operation:
  i. Normal Mode: Non-acoustic data transmitted to the shipboard receiver.
  ii. Calibration Mode: Command enabled sensor coefficient download and upload.
  iii. Fault Localization Mode: Command enabled test pattern and extended status mode.

oo. Command driven configurable NAS Coefficient download and upload. The ESN provides the ability for coefficients to be downloaded to the Heading Sensors and uploaded from the Heading Sensors if applicable. Calibration coefficients can be downloaded to and uploaded from the ESN for the Pressure, Temperature, and Current sensor correction which is performed at the ESN. Raw data can be provided to enable shipboard receiver correction if desired.

pp. Command Driven Performance Monitoring and Fault Location (PMFL) enables fixed data patterns to be inserted into the non-acoustic data fields for a group of sensors connected to a unique ESN. ESN internal test patterns are enabled at a granularity defined by the number of ESNs connected to each uniquely addressable Network Gateway.

qq. Failsafe Cable Line Receiver 2601 provides the interface to the common clock coax. High-speed comparator based design with hysteresis recovers control and timing data from differentiated edges generated by the Network Gateway. The receiver has redundant failsafe mechanisms. A Watchdog Timer internal to the ESN Controller FPGA 2623 floats inactive receivers. Additionally, the input resistors isolate failed receiver from common coax. This is a field proven design which enables the scalable iPEN Low Level Telemetry architecture.

rr. Failsafe Cable Line Driver 2603 drives acoustic data and local status onto the common data coax in a simple synchronous Time Division Multiplexed (TDM) scheme through a unique Bi-Impedance Network. The Bi-Impedance Network enables a CMOS Tri-state Driver internal to the ESN Controller FPGA to drive data edges onto the coax. Coax data traveling past the local driver is undisturbed even during failed conditions. The driver is disabled or tri-stated between transmissions and if the ESN is not locked to the clock coax input. Stuck or failed CMOS drivers, either High or Low do not degrade passing data. The diodes provide a +/−1.5 volt high impedance window. Even shorted diodes only slightly clip passing coax data. The resistor sets the DC bias on the coupling capacitor. Differentiated data has zero DC content independent of the data bias. This is a field proven design which enables the scalable iPEN Low Level Telemetry architecture.

The foregoing description of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

APPENDIX

The Appendix discloses the details of the frame and synchronization formats of the present invention.

What is claimed is:

1. A communication system located between a first location, including a data store, and a plurality of data sensors remote from the first location, at least some of the data sensors remote from other data sensors, said system comprising:
- a network controller at the first location generating and embedding plural timing and control signals, the timing and control signals arranged so that data which is synchronous with the timing signals will allow for data fusion notwithstanding wide geographic dispersion among said data sensors;
- a passive communication medium connecting said network controller and the remote data sensors and transmitting the timing and control signals from the network controller to the remote data sensors;
- a plurality of network gateways, each said network gateway coupled between said passive communications medium and one or more adjacent data sensors, each network gateway adapting the timing and
- control signals for extracting and generating timing signals to adjacent data sensors;
- a plurality of the data sensors responding to the timing signals for
- generating data signals, each of the network gateways responding to data signals from adjacent sensors for generating data signals synchronous with the timing signals for transmission along the passive communications medium towards the network controller,
- wherein an aggregate data rate from the remote data sensors
- towards the network controller is orders of magnitude larger than a data rate from the network controller towards the remote data sensors.

2. The system of claim 1, wherein at least one network gateway derives power only from the passive communications medium.

3. The system of claim 1, wherein all network gateways derive power only from the passive communications medium.

4. The system of claim 1, wherein at least one data sensor derives power only from the passive communications medium via a network gateway.

5. The system of claim 1, wherein all data sensors derive power only from the passive communications medium via a network gateway.

6. The system of claim 1, wherein the passive communications medium is an optical fiber.

7. The system of claim 1, wherein the communications medium is electrical cable.

8. The system of claim 1, wherein the passive communications medium is both optical fiber and electrical cable.

9. A system for providing data fusion in a network transporting data from diversely located network terminations to a network controller, said system comprising:
- said network controller generating and transmitting timing and control information;
- a plurality of network gateways;
- a plurality of said diversely located network terminations, each said network termination connected to a network gateway; and
- a passive medium of at least one of fiber and copper,
- wherein the passive medium connects the network controller and the plurality of network gateways, said medium conveying the timing and control information from the network controller to the gateways, the system providing synchronous sampling, data fusion and network message buffer alignment based on the timing and control information received at said plurality of network gateways.

10. The system of claim 9 wherein at least one of said network gateways derives power only from the passive medium.

11. The system of claim 9 wherein a plurality of network gateways derive power only from the passive medium.

12. The system of claim 9 where all of said network gateways derive power only from the passive medium.

13. A method for providing synchronous sampling, data fusion and network message buffer alignment, comprising:
- receiving at least one of a inverted Passive Optical Network (iPON) or inverted Passive Electrical Network (iPEN) downstream signals;
- extracting embedded Physical Media Dependent (PMD) and Transmission Convergence (TC) Layer Frame Sync and byte rate clock to generate Analog-to-Digital Conversion (ADC) sample clocks or triggers to smart sensors;
- receiving iPON/iPEN control bytes and extracting a proprietary primary frame and superframe indicator, sequence number, and time tag information;
- using recovered PMD and TC Layer information to create synchronized data acquisition signals;
- acquiring sensor data and aligning data message buffers with a recovered system superframe;
- inserting message time stamp, sequence number, and local Network Gateway status information; and
- transmitting sensor data formatted as standard network messages.

14. A Network Gateway apparatus comprising:
- a iPON/iPEN network interface;
- one or more sensor interfaces;
- network adaptation logic;
- sensor synchronization logic;
- data acquisition logic; and
- data buffering, said data buffering, sensor synchronization logic and network adaptation logic connected between said sensor interfaces and the iPON/iPEN network interface.

15. A method for operating a network gateway, comprising:
- bridging local communications into an iPON/iPEN network;
- time tagging a data stream;
- managing the Quality of Service (QoS) functions at a local level;
- accepting data from at least one of independent analog, digital and/or smart sensors;
- synchronizing the data to a time standard derived from the iPON/iPEN network to produce one or more data products;
- multiplexing multiple data products into super frames;
- optionally, encrypting or compressing the data products; and
- re-transmitting the data products over a at least one RF channels and IP-based networks supported on the iPON/iPEN network.

16. A method for operating a Network Gateway comprising:
- receiving at least one of the Passive Optical Network (iPON) and Passive Electrical Network (iPEN) downstream signal and
- extracting an embedded Physical Media Dependent (PMD) and
- Transmission Convergent (TC) Layer Frame Sync and byte rate clock to generate Analog-to-Digital Converter sample clocks or triggers for smart sensors;

receiving iPON/iPEN control bytes and extracting a proprietary super frame indicator, sequence number, and time tag information;
using recovered PMD and TC Layer information to create synchronized data acquisition signals;
acquiring sensor data and aligning data message buffers with a recovered system superframe;

inserting message time stamp, sequence number, and local Network Gateway status information; and
transmitting sensor data formatted as standard network messages.

* * * * *